(12) United States Patent
Kitabayashi

(10) Patent No.: US 11,962,948 B2
(45) Date of Patent: Apr. 16, 2024

(54) DISPLAY METHOD AND DISPLAY SYSTEM

(71) Applicant: SEIKO EPSON CORPORATION, Tokyo (JP)

(72) Inventor: Kazuyoshi Kitabayashi, Azumino (JP)

(73) Assignee: SEIKO EPSON CORPORATION, Tokyo (JP)

(*) Notice: Subject to any disclaimer, the term of this patent is extended or adjusted under 35 U.S.C. 154(b) by 140 days.

(21) Appl. No.: 17/669,475

(22) Filed: Feb. 11, 2022

(65) Prior Publication Data
US 2022/0264066 A1    Aug. 18, 2022

(30) Foreign Application Priority Data
Feb. 12, 2021    (JP) .................................. 2021-020524

(51) Int. Cl.
*H04N 9/31*    (2006.01)
*G06T 19/00*    (2011.01)

(52) U.S. Cl.
CPC ......... *H04N 9/3194* (2013.01); *G06T 19/006* (2013.01); *H04N 9/3188* (2013.01)

(58) Field of Classification Search
CPC .... G03B 21/28; G03B 21/145; G03B 21/147; H04N 9/3179; H04N 9/3185; H04N 9/3188; H04N 9/3194; G06T 19/00; G06T 19/006; G06T 19/20
See application file for complete search history.

(56) References Cited

U.S. PATENT DOCUMENTS 8,201,951 B2 *  6/2012  Ding .................... H04N 9/3191
                                                   353/121
2011/0216371 A1 *  9/2011  Katoh .................. H04N 1/3875
                                                   358/1.18
2019/0116356 A1    4/2019  Matoba et al.
2019/0295508 A1 *  9/2019  Tsuji ....................... G09G 5/377
2020/0275069 A1 *  8/2020  Tanaka ................. H04N 9/3185
2021/0407204 A1 * 12/2021  Wang ................... H04N 9/3185

FOREIGN PATENT DOCUMENTS

| JP | 2005-313291 A | 11/2005 |
| JP | 2014-056044 A | 3/2014 |
| JP | 2017-059931 A | 3/2017 |
| WO | 2017/179272 A1 | 10/2017 |
| WO | 2019/017023 A1 | 1/2019 |

OTHER PUBLICATIONS

"Epson Projector Throw Distance Simulator," v. 2.2.3 (Sep. 8, 2021).
"Sony Optimal Viewing Area Simulation," (Not dated).

* cited by examiner

*Primary Examiner* — Sultan Chowdhury
(74) *Attorney, Agent, or Firm* — Oliff PLC

(57) ABSTRACT

The display method includes obtaining a target image showing a target region including a surface in a real space having the target region and a display, and displaying, on the display, a first simulation image including the target image and a first display image which is superimposed on the target image and fits within the display irrespective of a position of the display in real space, the first display image being obtained by viewing an image projected on a virtual plane corresponding to the surface from a virtual projector in a virtual space, the virtual plane being located at a first position corresponding to a position of the surface in the real space, from a second position corresponding to the position of the display in the real space.

15 Claims, 15 Drawing Sheets

DISPLAY METHOD AND DISPLAY SYSTEM

The present application is based on, and claims priority from JP Application Serial Number 2021-020524, filed Feb. 12, 2021, the disclosure of which is hereby incorporated by reference herein in its entirety.

BACKGROUND

1. Technical Field

The present disclosure relates to a display method and a display system.

2. Related Art

International Publication No. WO 2017/179272 discloses an information processing device which displays a simulation image related to an appearance of a projection image projected from a projector. The simulation image shows an image of a room where the projector is located, and a screen on which the projection image is displayed. When a value with which the screen runs off the room is input to the information processing device, the information processing device displays the simulation image showing the screen which runs off the room.

When the information processing device described in International Publication No. WO 2017/179272 displays the simulation image showing the screen which runs off the room, there is a possibility that the projection image also runs off the room in the simulation image. The state in which the projection image runs off the room does not occur in reality. Therefore, it is difficult for the user to imagine the projection image to be projected in the actual room or the like in some cases when looking at the simulation image. In this case, it is necessary for the user to redo the input of the value, and the information processing device described in International Publication No. WO 2017/179272 is low in convenience.

SUMMARY

A display method according to an aspect of the present disclosure includes the steps of obtaining a target image showing a target region including a surface in a real space having the target region and a display, and displaying a first simulation image on the display irrespective of a position of the display when displaying a first display image on the display, wherein the first display image is an image obtained by viewing an image, which is projected on a virtual plane from a virtual projector in a virtual space having the virtual plane which is located at a first position corresponding to a position of the surface in the real space and which corresponds to the surface, and the virtual projector, from a second position corresponding to the position of the display in the real space, and the first simulation image is obtained by superimposing the first display image fitting within the display on the target image.

A display system according to another aspect of the present disclosure includes a camera, a display, and at least one processor, wherein the at least one processor executes the steps of obtaining a target image showing a target region including a surface in a real space having the target region and the display using the camera, and displaying a first simulation image on the display irrespective of a position of the display when displaying a first display image on the display, the first display image being an image obtained by viewing an image, which is projected on a virtual plane from a virtual projector in a virtual space having the virtual plane which is located at a first position corresponding to a position of the surface in the real space and which corresponds to the surface, and the virtual projector, from a second position corresponding to the position of the display in the real space, and the first simulation image being obtained by superimposing the first display image fitting within the display on the target image.

DESCRIPTION OF AN EXEMPLARY EMBODIMENT

A: First Embodiment

A1: Outline of Information Processing Device 1

Figure 1:
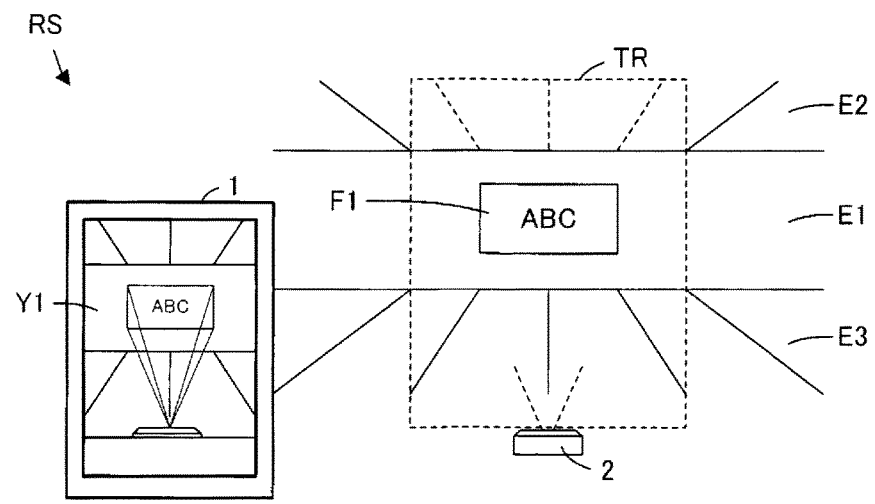
FIG. 1 is a diagram showing an information processing device 1.

FIG. 1 is a diagram showing an information processing device 1. The information processing device 1 is a smartphone. The information processing device 1 is not limited to the smartphone, but can also be, for example, a tablet with a camera, a laptop PC (Personal Computer) with a camera, or a laptop PC to which a camera is coupled. The information processing device 1 is an example of a display system. The information processing device 1 is located in a real space RS.

The real space RS includes a projector 2, a wall E1, a ceiling E2, and a floor E3 in addition to the information processing device 1. The position of the projector 2 in the real space RS is not limited to the position shown in FIG. 1, but can arbitrarily be changed.

The wall E1 is a vertical plane. The wall E1 is not limited to the vertical plane, but is only required to be a plane crossing a horizontal plane. The wall E1 is an inside wall of a building. The wall E1 is not limited to the inside wall of the building, but can be, for example, an outside wall of the building. At least a part of the wall E1 is an example of a plane. The plane is not limited to at least a part of the wall E1, but can also be, for example, at least a part of the ceiling E2, at least a part of the floor E3, a screen, a whiteboard, or a door. The plate is included in a target region TR.

The target region TR is included in the real space RS. The position of the target region TR in the real space RS is not limited to the position shown in FIG. 1, but can arbitrarily be changed.

The projector 2 projects a projection image F1 on the wall E1 using light. The information processing device 1 displays a first synthesized image Y1 related to an appearance of the projection image F1. The first synthesized image Y1 is an example of a first simulation image.

Figure 2:
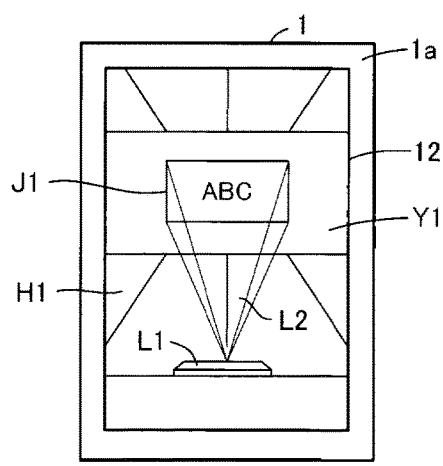
FIG. 2 is a diagram showing a front surface 1a of the information processing device 1.
Figure 3:
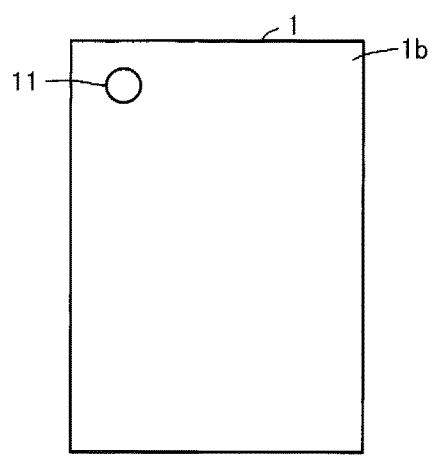
FIG. 3 is a diagram showing a back surface 1b of the information processing device 1.

The information processing device 1 includes a front surface 1a, a back surface 1b, a camera 11, and a touch panel 12. FIG. 2 is a diagram showing the front surface 1a of the information processing device 1. FIG. 3 is a diagram showing the back surface 1b of the information processing device 1.

The camera 11 is located on the back surface 1b of the information processing device 1. The camera 11 takes an image of an imaging region. The imaging region of the camera 11 moves in accordance with a movement of the information processing device 1.

The imaging region of the camera 11 is used as the target region TR. Therefore, the target region TR moves in accordance with a movement of the information processing device 1. The camera 11 takes the image of the target region TR in the state in which the projector 2 does not project the projection image F1 to thereby generate a target image H1 showing the target region TR. The target image H1 showing the target region TR means an image showing an object existing in the target region TR.

Figure 4:
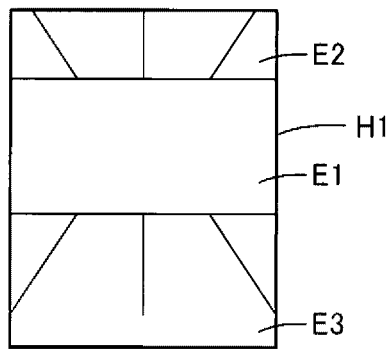
FIG. 4 is a diagram showing an example of a target image H1.

FIG. 4 is a diagram showing an example of the target image H1. The target image H1 shows the wall E1, the ceiling E2, and the floor E3.

As shown in FIG. 2, the touch panel 12 is located on the front surface 1a of the information processing device 1. The touch panel 12 is an example of the display. The touch panel 12 displays the first synthesized image Y1.

The first synthesized image Y1 is an image obtained by superimposing a sample image J1 fitting within the touch panel 12 on the target image H1. The sample image J1 shows, for example, the projection image F1. The sample image J1 can be an image different from the projection image F1 such as an image obtained by monochromating the projection image F1. The sample image J1 has a predetermined transmittance. The transmittance of the sample image J1 can be variable.

The first synthesized image Y1 includes a projector image L1. The projector image L1 is an image showing a projector. The shape of the projector shown in the projector image L1 is the same as the shape of the projector 2. The shape of the projector shown in the projector image L1 can be different from the shape of the projector 2. The projector image L1 has a predetermined transmittance. The transmittance of the projector image L1 can be variable.

The first synthesized image Y1 further includes a path image L2. The path image L2 is an image showing a path of light used when the projector 2 projects the projection image F1. The path image L2 is also an image showing a path of light virtually used when a virtual projector C4 projects an image. The virtual projector C4 is a virtual projector corresponding to the projector 2. The path image L2 has a predetermined transmittance. The transmittance of the path image L2 can be variable.

At least one of the projector image L1 and the path image L2 is not required to be included in the first synthesized image Y1.

A2: Example of Information Processing Device 1

Figure 5:
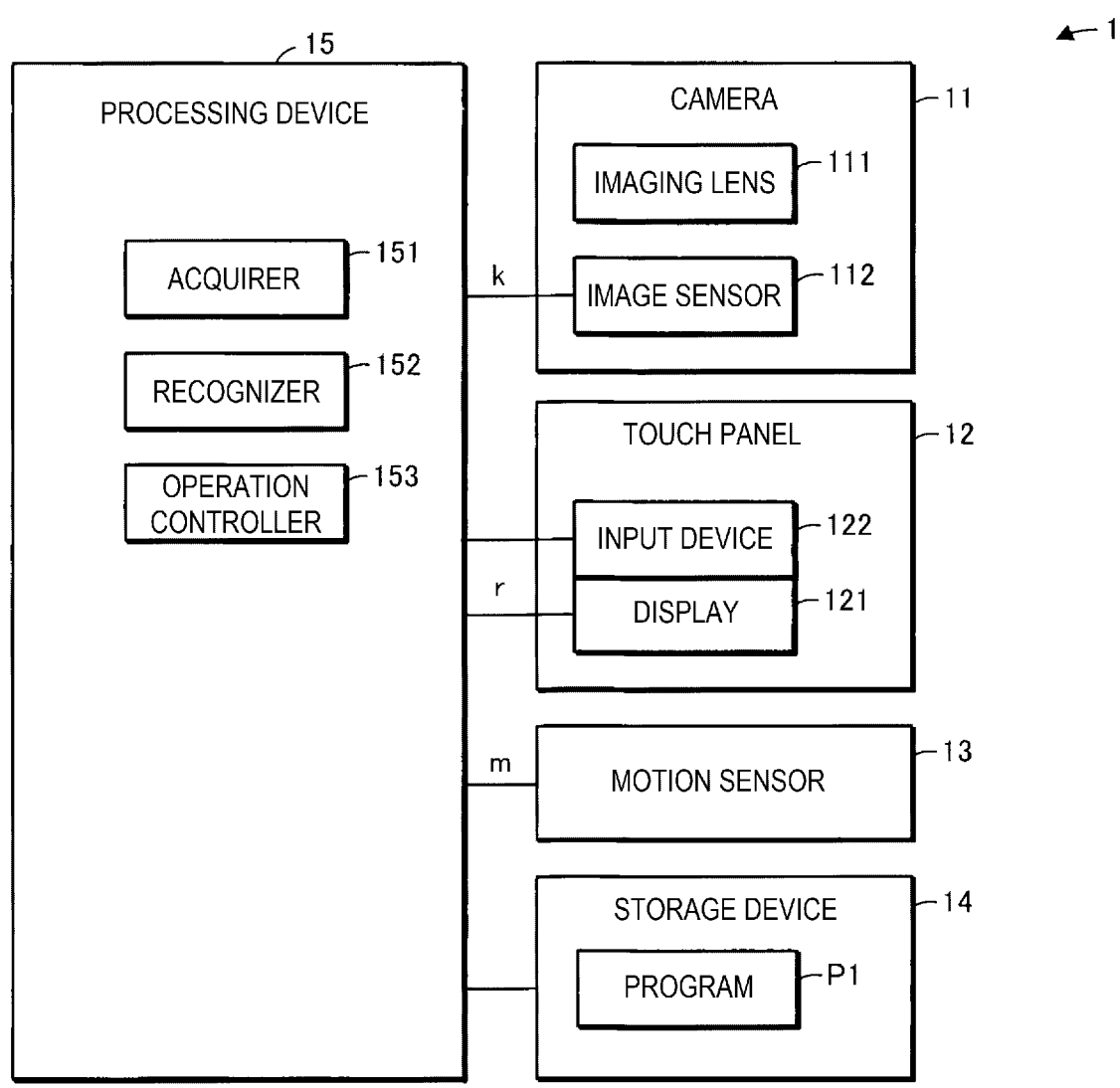
FIG. 5 is a diagram showing an example of the information processing device 1.

FIG. 5 is a diagram showing an example of the information processing device 1. The information processing device 1 includes the camera 11, the touch panel 12, a motion sensor 13, a storage device 14, and a processing device 15.

The camera 11 includes an imaging lens 111 and an image sensor 112.

The imaging lens 111 forms an optical image on the image sensor 112. The imaging lens 111 forms the target image H1 representing the target region TR on the image sensor 112.

The image sensor 112 is a CCD (Charge Coupled Device) image sensor. The image sensor 112 is not limited to the CCD image sensor, but can also be, for example, a CMOS (Complementary Metal Oxide Semiconductor) image sensor. The image sensor 112 generates imaging data k based on the optical image formed on the image sensor 112. For example, the image sensor 112 generates imaging data kt representing the target image H1 based on the target image H1 formed by the imaging lens 111. The imaging data kt is an example of the imaging data k.

The touch panel 12 includes a display 121 and an input device 122. The display 121 displays a variety of images. The input device 122 receives a variety of instructions.

The motion sensor 13 includes an acceleration sensor and a gyro sensor. The motion sensor 13 detects a motion of the information processing device 1. For example, the motion sensor 13 detects the motion of the information processing device 1 moved by the user. The motion of the information processing device 1 is represented by at least a moving distance of the information processing device 1, an amount of rotation of the information processing device 1, and a direction of the information processing device 1. The motion sensor 13 generates motion data m representing the motion of the information processing device 1.

The storage device 14 is a recording medium which can be read by the processing device 15. The storage device 14 includes, for example, a nonvolatile memory and a volatile memory. The nonvolatile memory is one of, for example, a ROM (Read Only Memory), an EPROM (Erasable Programmable Read Only Memory), and an EEPROM (Electrically Erasable Programmable Read Only Memory). The volatile memory is, for example, a RAM (Random Access Memory). The storage device 14 stores a program P1 and a variety of types of data. The program P1 is, for example, an application program. The program P1 is provided to the information processing device 1 from a server not shown. The program P1 can be stored in advance in the storage device 14.

The processing device 15 is formed of a signal CPU (Central Processing Unit) or a plurality of CPUs. The single CPU or the plurality of CPUs is an example of a single processor or a plurality of processors. The processor is an example of a processor set forth in the appended claims. Each of the CPU and the processor is an example of a computer.

The processing device 15 retrieves the program P1 from the storage device 14. The processing device 15 executes the program P1 to thereby function as an acquirer 151, a recognizer 152, and an operation controller 153.

It is possible for the processing device 15 to function as the acquirer 151 and the operation controller 153 by executing the program P1, and function as the recognizer 152 by executing a program different from the program P1. In this case, the program different from the program P1 is stored in the storage device 14, and the processing device 15 retrieves the program different from the program P1 from the storage device 14.

Each of the acquirer 151, the recognizer 152, and the operation controller 153 can be realized by a circuit such as a DSP (Digital Signal Processor), an ASIC (Application Specific Integrated Circuit), a PLD (Programmable Logic Device), or an FPGA (Field Programmable Gate Array).

The acquirer 151 obtains the target image H1 showing the target region TR. For example, the acquirer 151 obtains the imaging data kt representing the target image H1 from the camera 11 to thereby obtain the target image H1. Further, the acquirer 151 obtains motion data m representing the motion of the information processing device 1 from the motion sensor 13.

The recognizer 152 obtains the imaging data kt and the motion data m from the acquirer 151. The recognizer 152 executes three-dimensional measurement with respect to an object existing in the target region TR based on the imaging data kt and the motion data m. The recognizer 152 decides a position in the real space RS of the camera 11 based on the motion data m. The recognizer 152 executes the three-dimensional measurement using the position of the camera 11 in the real space RS and the imaging data Kt.

The recognizer 152 executes the three-dimensional measurement in the following manner in the situation in which the information processing device 1 is moved from a first point to a second point while the camera 11 is imaging the wall E1.

The recognizer 152 obtains motion data ms from the acquirer 151. The motion data ms corresponds to the motion data m which is generated by the motion sensor 13 in the situation in which the information processing device 1 is moved from the first point to the second point while the camera 11 is imaging the wall E1. The recognizer 152 decides the distance from the first point to the second point as the base line length based on the motion data ms. The base line length is also referred to as a length of a base line.

The recognizer 152 obtains the first imaging data k1 and second imaging data k2 from the acquirer 151. The first imaging data k1 corresponds to the imaging data kt which is generated by the camera 11 when the information processing device 1 is located at the first point. The second imaging data k2 corresponds to the imaging data kt which is generated by the camera 11 when the information processing device 1 is located at the second point. Each of the first imaging data k1 and the second imaging data k2 represents at least the wall E1.

The recognizer 152 executes the triangulation using the base line length, the first imaging data k1, and the second imaging data k2 to thereby execute the three-dimensional measurement.

The result of the three-dimensional measurement expresses the shape of the object existing in the target region TR using three-dimensional coordinates. The recognizer 152 recognizes the wall E1 based on the result of the three-dimensional measurement. For example, the recognizer 152 recognizes a vertical plane as the wall E1 based on the result of the three-dimensional measurement. The recognizer 152 decides a distance n from the information processing device 1 to the wall E1 based on the result of the three-dimensional measurement.

The operation controller 153 controls an operation of the information processing device 1. The operation controller 153 provides image data r representing an image to the touch panel 12 to thereby make the touch panel 12 display the image represented by the image data r.

The operation controller 153 makes the touch panel 12 display the first synthesized image Y1. The operation controller 153 generates first image data r1 based on the result of the three-dimensional measurement, the imaging data kt, the motion data m representing the motion of the information processing device 1, and specifications of the virtual projector C4. The first image data r1 represents the first synthesized image Y1. The first image data r1 is an example of the image data r.

The operation controller 153 decides an image obtained by superimposing the sample image J1, the projector image L1, and the path image L2 on the target image H1 as the first synthesized image Y1.

Figure 6:
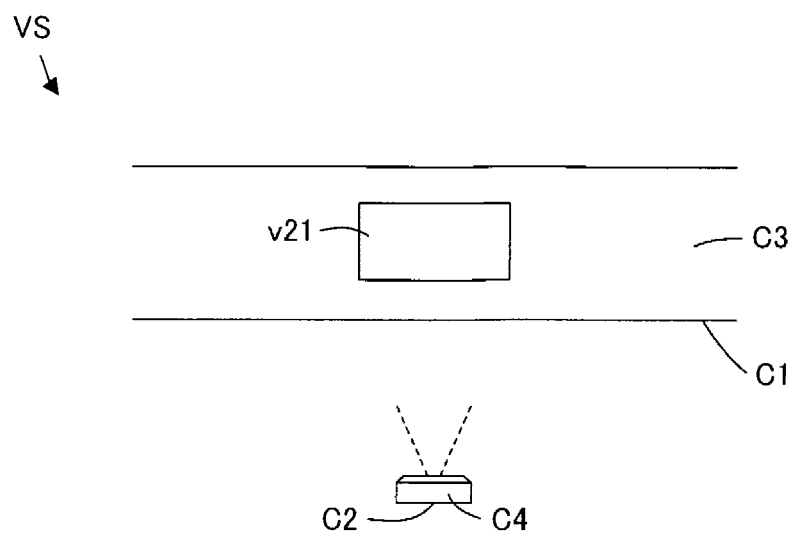
FIG. 6 is a diagram showing an example of a virtual space VS.

The operation controller 153 decides the sample image J1 and so on using the virtual space VS as a three-dimensional space. FIG. 6 is a diagram showing an example of the virtual space VS.

The operation controller 153 uses the virtual space VS to thereby reproduce the arrangement of the object in the real space RS.

The operation controller 153 uses the result of the three-dimensional measurement with respect to the wall E1 to thereby set a first position C1 in the virtual space VS. The first position C1 in the virtual space VS corresponds to a position of the wall E1 in the real space RS.

The operation controller 153 decides a shape of a virtual plane C3 based on the result of the three-dimensional measurement with respect to the wall E1. The shape of the virtual plane C3 is the same as a shape represented by the result of the three-dimensional measurement with respect to the wall E1. The virtual plane C3 is a plane corresponding to the wall E1. The operation controller 153 disposes the virtual plane C3 at the first position C1.

The operation controller 153 sets a second position C2 in the virtual space VS based on the position of the camera 11 in the real space RS. The second position C2 in the virtual space VS corresponds to the position of the camera 11 in the real space RS. The camera 11 is located in the information processing device 1 together with the touch panel 12. Therefore, the second position C2 in the virtual space VS corresponds to a position of the camera 11 in the real space RS, and at the same time, corresponds to a position of the touch panel 12 in the real space RS.

The operation controller 153 disposes the virtual projector C4 at the second position C2. Therefore, in the virtual space VS, a relative position of the virtual projector C4 to the second position C2 is fixed. In the virtual space VS, the state in which the relative position of the virtual projector C4 to the second position C2 is fixed is not limited to the state in which the virtual projector C4 is located at the second position C2. For example, in the virtual space VS, it is possible for the relative position of the virtual projector C4 to the second position C2 to be fixed in the state in which the virtual projector C4 is located at a position different from the second position C2.

The second position C2 changes in accordance with the change in position of the touch panel 12 in the real space RS. Therefore, in the situation in which the relative position of the virtual projector C4 to the second position C2 is fixed in the virtual space VS, when the position of the touch panel 12 in the real space RS changes, the position of the virtual projector C4 changes in the virtual space VS.

The virtual projector C4 is a virtual projector corresponding to the projector 2. The specifications of the virtual projector C4 are substantially the same as specifications of the projector 2. The specifications of the projector 2 are described in the program P1. Therefore, the operation controller 153 recognizes the specifications of the projector 2 and the specifications of the virtual projector C4 in advance. It should be noted that the specifications of the projector 2 include a field angle of the projector 2.

The operation controller 153 makes the orientation of the optical axis of a projection lens of the virtual projector C4 with respect to the virtual plane C3 coincide with the orientation of the optical axis of the imaging lens 111 with respect to the wall E1. It should be noted that the operation controller 153 decides the orientation of the optical axis of the imaging lens 111 with respect to the wall E1 based on the recognition result of the wall E1 and the motion data m representing the motion of the information processing device 1.

The operation controller 153 disposes an image v21 on the virtual plane C3. The image v21 is an image to be displayed on the virtual plane C3 in the situation in which the virtual projector C4 projects a first image having a rectangular shape on the virtual plane C3. The first image having the rectangular shape is, for example, a monochrome image having the rectangular shape. The first image having the rectangular shape is not limited to the monochrome image having the rectangular shape. It is sufficient for the first image having the rectangular shape to be an image having the rectangular shape. When the optical axis of the projection lens of the virtual projector C4 is tilted with respect to a normal line of the virtual plane C3, the image v21 has a keystone distortion. The keystone distortion will be described later. Therefore, the image v21 has a possibility of failing to coincide with the first image having the rectangular shape. However, the image v21 is an image based on the first image having the rectangular shape.

An image obtained by viewing the image v21 displayed on the virtual plane C3 from the second position C2 is referred to as a "screen image v2." The screen image v2 is an example of each of a first display image and a second display image.

The first display image is an image obtained by viewing an image, which is displayed on the virtual plane C3 in the situation in which the image is projected from the virtual projector C4 on the virtual plane C3 located at the first position C1 in the virtual space VS, from the second position C2.

The second display image is an image obtained by viewing an image, which is displayed on the virtual plane C3 in the situation in which the image is projected on the virtual plane C3 located at the first position C1 from the virtual projector C4 the relative position to the second position C2 of which is fixed in the virtual space VS, from the second position C2.

The image v21 is an image showing a region in which an image J1a not shown is displayed. The image v21 functions as a screen of the image J1a.

The image J1a is an image to be displayed on the virtual plane C3 in the situation in which the virtual projector C4 projects a second image having a rectangular shape on the virtual plane C3. The second image having the rectangular shape is, for example, an image having the rectangular shape selected by the user. The second image having the rectangular shape is not limited to the image having the rectangular shape selected by the user. It is sufficient for the second image having the rectangular shape to be an image having the rectangular shape. When the optical axis of the projection lens of the virtual projector C4 is tilted with respect to the normal line of the virtual plane C3, the image J1a has a keystone distortion. Therefore, the image J1a has a possibility of failing to coincide with the second image having the rectangular shape. However, the image J1a is an image based on the second image having the rectangular shape.

The sample image J1 is an image obtained by viewing the image J1a displayed on the virtual plane C3 from the second position C2. The sample image J1 is an example of each of the first display image and the second display image.

The position of the image v21 in the virtual plane C3 is fixed in accordance with a position fixation instruction from the user. Until the position fixation instruction is obtained from the user, the operation controller 153 decides the position of the image v21 in the virtual plane C3 based on a position of an intersection between the virtual plane C3 and the optical axis of the projection lens of the virtual projector C4. For example, the operation controller 153 conforms a central position of the image v21 in the virtual plane C3 to the position of the intersection between the virtual plane C3 and the optical axis of the projection lens of the virtual projector C4. The central position of the image v21 is, for example, a position of an intersection of diagonal lines in the image v21.

When the operation controller 153 makes the touch panel 12 display the screen image v2, the operation controller 153 makes the touch panel 12 display a second synthesized image Y2 irrespective of the position of the touch panel 12 in the real space RS.

Figure 7:
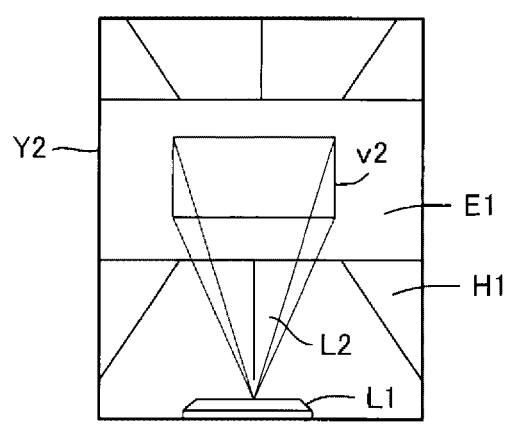
FIG. 7 is a diagram showing an example of a second synthesized image Y2.

FIG. 7 is a diagram showing an example of the second synthesized image Y2. The second synthesized image Y2 is an example of the first simulation image. The second synthesized image Y2 is an image obtained by superimposing the screen image v2 fitting within the touch panel 12 on the target image H1.

The size of the screen image v2 fitting within the touch panel 12 is equal to or smaller than a size a1. The size a1 is the size of the image obtained by viewing the image v21 displayed on the virtual plane C3 from the second position C2.

Figure 8:
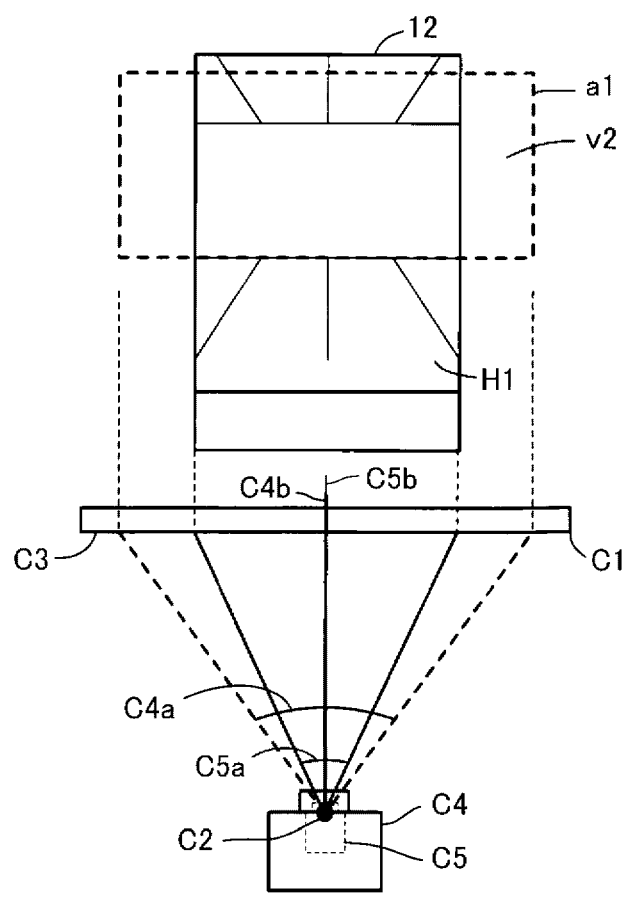
FIG. 8 is a diagram for explaining an example of a size a1.

FIG. 8 is a diagram for explaining an example of the size a1. In FIG. 8, the size and the shape of the screen image v2 are the same as the size and the shape of the image v21. FIG. 8 shows an example of the size a1, the virtual projector C4, a field angle C4a of the virtual projector C4, the screen image v2, the virtual plane C3, a virtual camera C5, a field angle C5a of the virtual camera C5, the target image H1, and the touch panel 12.

The virtual camera C5 is a virtual camera corresponding to the camera 11. Specifications of the virtual camera C5 are substantially the same as specifications of the camera 11. The specifications of the camera 11 include the field angle of the camera 11. Therefore, the field angle C5a of the virtual camera C5 is equal to the field angle of the camera 11. The specifications of the camera 11 are described in the program P1. Therefore, the operation controller 153 recognizes the specifications of the camera 11 and the specifications of the virtual camera C5 in advance.

Similarly to the virtual projector C4, the virtual camera C5 is located at the second position C2. The position of an optical axis C5b of the virtual camera C5 coincides with the position of an optical axis C4b of the virtual projector C4. The field angle C4a of the virtual projector C4 is equal to the field angle of the projector 2. Therefore, a relationship between the field angle C5a of the virtual camera C5 and the field angle C4a of the virtual projector C4 is equal to a relationship between the field angle of the camera 11 and the field angle of the projector 2.

The size of the image v21 and the size a1 of the screen image v2 depend on the field angle C4a of the virtual projector C4. The size of the target image H1 depends on the field angle of the camera 11. The field angle of the camera 11 is equal to the field angle C5a of the virtual camera C5. Therefore, the size of the target image H1 depends on the field angle C5a of the virtual camera C5. The size of the target image H1 is set to a size with which the target image H1 fits within the touch panel 12.

When the screen image v2 is superimposed on the target image H1 in the situation in which the field angle C4a of the virtual projector C4 is larger than the field angle C5a of the virtual camera C5, the screen image v2 does not fit within the target image H1. When the screen image v2 does not fit within the target image H1, there is a possibility that a portion which is not superimposed on the target image H1 out of the screen image v2 is not displayed on the touch panel 12. For example, as shown in FIG. 8, when the screen image v2 does not fit within the target image H1 in the situation in which the length in the horizontal direction of the target image H1 coincides with the length in the horizontal direction of the touch panel 12, the portion which is not superimposed on the target image H1 out of the screen image v2 is not displayed on the touch panel 12. It is difficult for the user to imagine the projection image F1 to be actually projected even when looking at the touch panel 12 which does not display the whole of the screen image v2.

Therefore, when the operation controller 153 makes the touch panel 12 display the screen image v2, the operation controller 153 makes the touch panel 12 display the second synthesized image Y2 irrespective of the position of the touch panel 12. As shown in FIG. 7, the second synthesized image Y2 is an image obtained by superimposing the screen image v2 fitting within the touch panel 12 on the target image H1.

Figure 9:
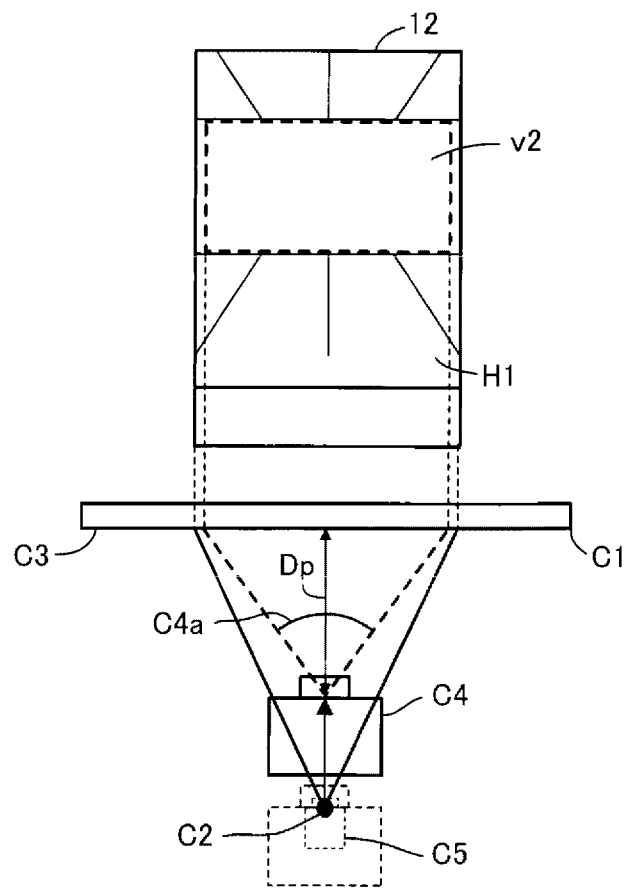
FIG. 9 is a diagram showing an adjustment example of a distance Dp between a virtual plane C3 and a virtual projector C4.

As shown in FIG. 9, the operation controller 153 adjusts a distance Dp between the virtual plane C3 and the virtual projector C4 to thereby adjust the size of the screen image v2 so that the screen image v2 fits within the touch panel 12.

For example, the operation controller 153 adjusts the distance Dp between the virtual plane C3 and the virtual projector C4 based on the distance between the touch panel 12 and the wall E1 to thereby adjust the size of the screen image v2 so that the screen image v2 fits within the touch panel 12. It should be noted that since the touch panel 12 is located in the information processing device 1, the operation controller 153 uses a distance n from the information processing device 1 to the wall E1 as the distance between the touch panel 12 and the wall E1.

In one example, the operation controller 153 adjusts the distance between the virtual plane C3 and the virtual projector C4 based on the distance between the touch panel 12 and the wall E1, and the field angle C4a of the virtual projector C4 to thereby adjust the size of the screen image v2 so that the screen image v2 fits within the touch panel 12. FIG. 9 shows an example in which the size of the screen image v2 is adjusted by making the virtual projector C4 come closer to the virtual plane C3 using these methods. The details will be described later with reference to FIGS. 12 and 13.

The operation controller 153 provides the second image data r2 representing the second synthesized image Y2 to the touch panel 12 to thereby make the touch panel 12 display the second synthesized image Y2.

Further, the operation controller 153 changes the screen image v2 to the sample image J1 in accordance with, for example, the instruction by the user.

When the operation controller 153 makes the touch panel 12 display the sample image J1, the operation controller 153 makes the touch panel 12 display the first synthesized image Y1 irrespective of the position of the touch panel 12. The first synthesized image Y1 is an image obtained by superimposing a sample image J1 fitting within the touch panel on the target image H1. For example, the operation controller 153 adjusts the size of the sample image J1 so that the sample image J1 fits within the touch panel 12 using substantially the same method as the method of adjusting the size of the screen image v2.

The operation controller 153 provides the first image data r1 representing the first synthesized image Y1 to the touch panel 12 to thereby make the touch panel 12 display the first synthesized image Y1.

A3: Recognition of Wall E1

Figure 10:
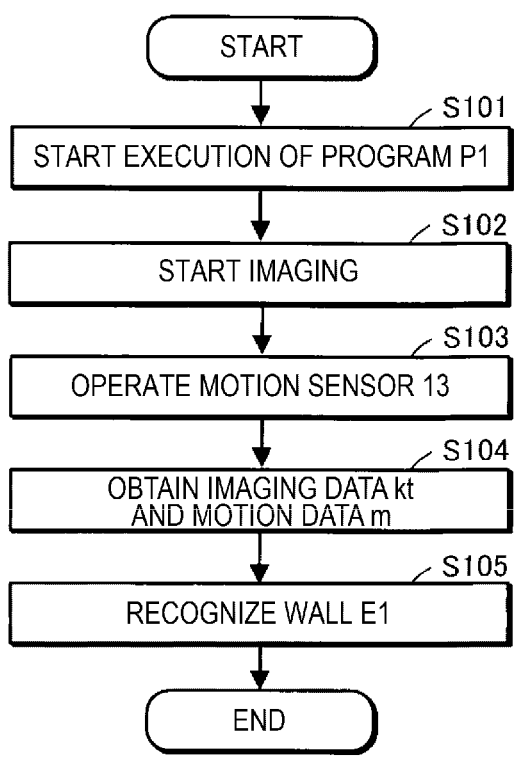
FIG. 10 is a flowchart for explaining recognition of a wall E1.

FIG. 10 is a flowchart for explaining an operation of recognizing the wall E1.

When the touch panel 12 has received a start-up instruction from the user, the processing device 15 starts execution of the program P1 as an application program in the step S101.

Subsequently, in the step S102, the operation controller 153 makes the camera 11 start imaging of the target region TR. The camera 11 images the target region TR to thereby generate the imaging data kt.

Subsequently, in the step S103, the operation controller 153 makes the motion sensor 13 operate. The motion sensor 13 generates motion data m representing the motion of the information processing device 1.

Subsequently, in the step S104, the acquirer 151 starts acquisition of the imaging data kt and the motion data m.

Subsequently, in the step S105, the operation controller 153 makes the recognizer 152 recognize the wall E1.

In the step S105, the recognizer 152 executes the three-dimensional measurement with respect to the object existing in the target region TR based on the imaging data kt and the motion data m obtained by the acquirer 151 in a scanning situation.

The scanning situation means the situation in which the information processing device 1 is moved from the first point to the second point while the camera 11 is imaging the wall E1. The first point is, for example, a position of the information processing device 1 at the starting point of the scanning situation. The second point is, for example, a position of the information processing device 1 at the ending point of the scanning situation. The imaging data kt obtained by the acquirer 151 in the scanning situation corresponds to the first imaging data k1 and the second imaging data k2. The first imaging data k1 corresponds to the imaging data kt which is generated by the camera 11 when the information processing device 1 is located at the first point. The second imaging data k2 corresponds to the imaging data kt which is generated by the camera 11 when the information processing device 1 is located at the second point. The motion data m obtained by the acquirer 151 in the scanning situation corresponds to the motion data ms. The motion data ms corresponds to the motion data m which is generated by the motion sensor 13 in the situation in which the information processing device 1 is moved from the first point to the second point while the camera 11 is imaging the wall E1.

The recognizer 152 decides the distance from the first point to the second point as the base line length based on the motion data ms. The recognizer 152 executes the triangulation using the base line length, the first imaging data k1, and the second imaging data k2 to thereby execute the three-dimensional measurement.

Subsequently, the recognizer 152 recognizes the wall E1 based on the result of the three-dimensional measurement. For example, the recognizer 152 recognizes a vertical plane as the wall E1 based on the result of the three-dimensional measurement.

A4: Display of First Synthesized Image Y1 and Second Synthesized Image Y2

Figure 11:
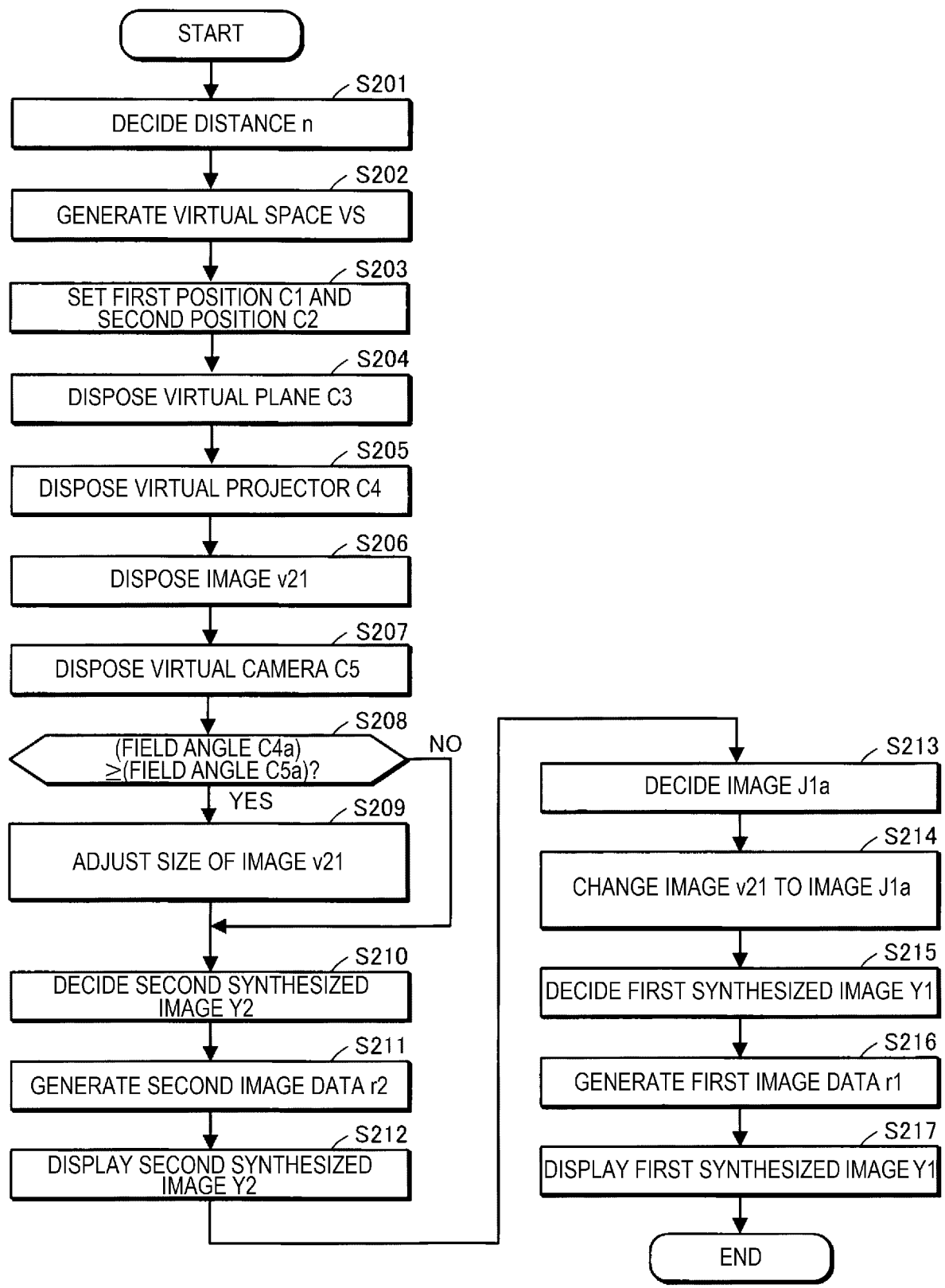
FIG. 11 is a flow chart for explaining display of a first synthesized image Y1 and the second synthesized image Y2.

FIG. 11 is a flow chart for explaining an operation of displaying the first synthesized image Y1 and the second synthesized image Y2. The operation shown in FIG. 11 is executed in the situation in which the wall E1 is recognized.

In the step S201, the operation controller 153 makes the recognizer 152 decide the distance n from the information processing device 1 to the wall E1.

In the step S201, the recognizer 152 first obtains the motion data m representing the motion of the information processing device 1 from the acquirer 151. Subsequently, the recognizer 152 decides the position of the information processing device 1 in the real space RS, namely the position of the camera 11 in the real space RS, based on the motion data m. Subsequently, the recognizer 152 decides the distance n from the information processing device 1 to the wall E1 based on the result of the three-dimensional measurement and the position of the camera 11. For example, the recognizer 152 decides the distance from the camera 11 to the wall E1 as the distance n from the information processing device 1 to the wall E1.

Subsequently, in the step S202, the operation controller 153 generates the virtual space VS.

Subsequently, in the step S203, the operation controller 153 sets the first position C1 and the second position C2 in the virtual space VS.

In the step S203, the operation controller 153 first uses the result of the three-dimensional measurement with respect to the wall E1 to thereby set the first position C1 in the virtual space VS. The first position C1 in the virtual space VS corresponds to a position of the wall E1 in the real space RS. Subsequently, the operation controller 153 sets the second position C2 in the virtual space VS based on the position of the camera 11 in the real space RS. The second position C2 in the virtual space VS corresponds to the position of the camera 11 in the real space RS.

Subsequently, in the step S204, the operation controller 153 disposes the virtual plane C3 in the virtual space VS.

In the step S204, the operation controller 153 first makes the shape of the virtual plane C3 coincide with the shape of the wall E1 based on the result of the three-dimensional measurement with respect to the wall E1. Subsequently, the operation controller 153 disposes the virtual plane C3 at the first position C1.

Subsequently, in the step S205, the operation controller 153 disposes the virtual projector C4 at the second position C2.

In the step S205, the operation controller 153 disposes the virtual projector C4 at the second position C2 to thereby fix the relative position of the virtual projector C4 to the second position C2. Subsequently, the operation controller 153 decides the orientation of the optical axis of the imaging lens 111 with respect to the wall E1 based on the recognition result of the wall E1 and the motion data m representing the motion of the information processing device 1. Subsequently, the operation controller 153 makes the orientation of the optical axis of the projection lens of the virtual projector C4 with respect to the virtual plane C3 coincide with the orientation of the optical axis of the imaging lens 111 with respect to the wall E1.

Subsequently, in the step S206, the operation controller 153 disposes the image v21 on the virtual plane C3.

In the step S206, the operation controller 153 conforms the central position of the image v21 in the virtual plane C3 to the position of the intersection between the virtual plane C3 and the optical axis of the projection lens of the virtual projector C4. It should be noted that the central position of the image v21 is not limited to the position of the intersection between the virtual plane C3 and the optical axis of the projection lens of the virtual projector C4, but is only required to be a position based on the position of the intersection. Subsequently, the operation controller 153 decides the correspondence relationship between the distance n from the information processing device 1 to the wall E1 and the size of the image v21 based on the field angle of the projector 2. The operation controller 153 decides the size of the image v21 based on the correspondence relationship between the distance n and the size of the image v21, and the determination result of the distance n by the recognizer 152. For example, the operation controller 153 increases the size of the image v21 in accordance with an increase in the distance n. Subsequently, the operation controller 153 sets the path of the projection light proceeding from the virtual projector C4 toward the image v21 in the virtual space VS.

Subsequently, in the step S207, the operation controller 153 disposes the virtual camera C5 at the second position C2.

In the step S207, the operation controller 153 disposes the virtual camera C5 at the second position C2 to thereby fix the relative position of the virtual camera C5 to the second position C2. Subsequently, the operation controller 153 makes the orientation of the optical axis of the imaging lens of the virtual camera C5 with respect to the virtual plane C3 coincide with the orientation of the optical axis of the imaging lens 111 with respect to the wall E1.

Subsequently, in the step S208, the operation controller 153 determines whether or not the field angle C4a of the virtual projector C4 is equal to or larger than the field angle C5a of the virtual camera C5.

When the operation controller 153 judges that the field angle C4a of the virtual projector C4 is equal to or larger than the field angle C5a of the virtual camera C5, the operation controller 153 adjusts the size of the image v21 in the step S209. When the operation controller 153 judges that the field angle C4a of the virtual projector C4 is smaller than the field angle C5a of the virtual camera C5, the step S209 is skipped.

In the step S209, the operation controller 153 adjusts the distance between the virtual plane C3 and the virtual projector C4 based on the distance between the touch panel 12 and the wall E1 to thereby adjust the size of the image v21 so that the image v21 fits within the touch panel 12. For example, the operation controller 153 adjusts the distance between the virtual plane C3 and the virtual projector C4 based on the distance between the touch panel 12 and the wall E1 using Formula 1 and Formula 2 described below. Specifically, the operation controller 153 adjusts the size of the image v21 by making the virtual projector C4 come closer to the virtual plane C3.

Figure 12:
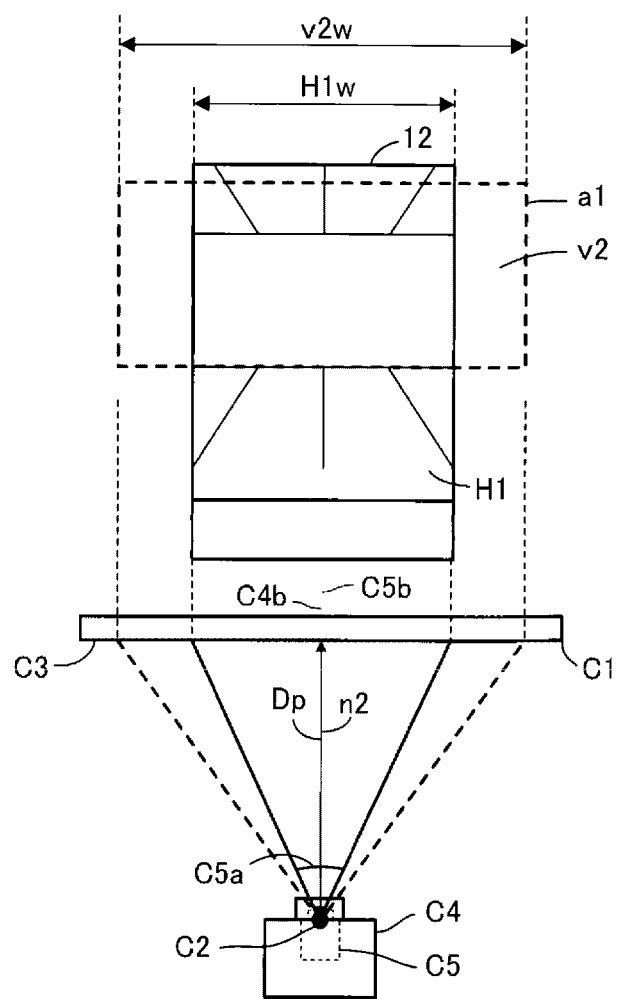
FIG. 12 is a diagram showing a situation before making the virtual projector C4 come closer to the virtual plane C3.

FIG. 12 is a diagram showing a situation before making the virtual projector C4 come closer to the virtual plane C3. In the situation shown in FIG. 12, the distance Dp from the virtual projector C4 to the virtual plane C3 is equal to the distance n2 from the virtual camera C5 to the virtual plane C3. It should be noted that the operation controller 153 uses the distance n from the information processing device 1 to the wall E1 as the distance n2 from the virtual camera C5 to the virtual plane C3. Since the information processing device 1 includes the touch panel 12, the distance n from the information processing device 1 to the wall E1 means the distance between the touch panel 12 and the wall E1. Therefore, the distance n2 from the virtual camera C5 to the virtual plane C3 means the distance between the touch panel 12 and the wall E1.

When the distance n2 from the virtual camera C5 to the virtual plane C3 is the distance n from the information processing device 1 to the wall E1, the width H1w of the target image H1 is expressed by Formula 1.

$$H1w = \tan(C5a/2) * n2 * 2 \quad \text{Formula 1}$$

In the situation in which the field angle C4a of the virtual projector C4 is equal to or larger than the field angle C5a of the virtual camera C5, when the distance Dp from the virtual projector C4 to the virtual plane C3 is equal to the distance n2 from the virtual camera C5 to the virtual plane C3, the width v2w of the screen image v2 becomes equal to or larger than the width H1w of the target image H1.

Figure 13:
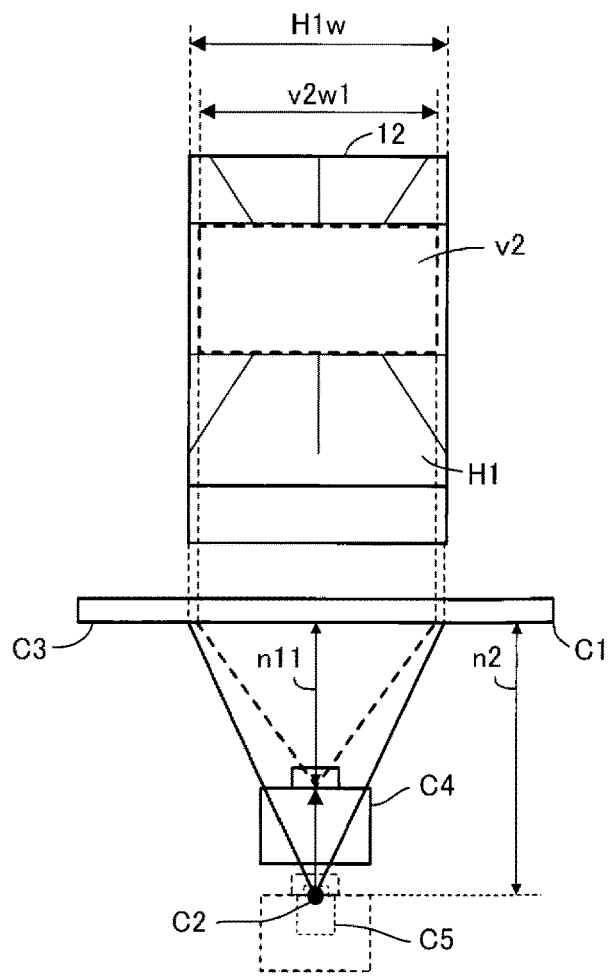
FIG. 13 is a diagram showing a situation after making the virtual projector C4 come closer to the virtual plane C3.

FIG. 13 is a diagram showing a situation after making the virtual projector C4 come closer to the virtual plane C3. In the situation shown in FIG. 13, the distance Dp from the virtual projector C4 to the virtual plane C3 is set to a distance n11. The distance n11 is shorter than the distance n2 from the virtual camera C5 to the virtual plane C3.

The operation controller 153 sets the distance Dp from the virtual projector C4 to the virtual plane C3 to the distance n11 so that the width v2w1 of the screen image v2 becomes smaller than the width H1w of the target image H1. When the width v2w1 of the screen image v2 is smaller than the width H1w of the target image H1, a gap occurs between an end of the screen image v2 and an end of the touch panel 12 as shown in FIG. 13. Therefore, it becomes easy for the user to recognize the end of the screen image v2. Therefore, it is possible for the user to easily recognize the size of the screen image v2.

The operation controller 153 uses Formula 2 to thereby decide the distance n11.

$$n11 = H1w * \alpha * b \text{ where } \alpha = (Dp)/(v2wa), b = 0.98 \quad \text{Formula 2}$$

The character string Dp represents the distance from the virtual projector C4 to the virtual plane C3.

The character string v2wa represents the width of the screen image v2 when the distance from the virtual projector C4 to the virtual plane C3 is the distance Dp.

The value a is uniquely decided by the field angle C4a of the virtual projector C4. In other words, the value a is a fixed value depending on the specifications of the projector 2.

The character b represents a coefficient for making the width of the screen image v2 smaller than the width H1W of the target image H1.

The coefficient b is not limited to 0.98, but is only required to have a value fulfilling the relationship of 0<b<1. The value of the coefficient b can be, for example, 0.9.

The width of the screen image v2 increases in accordance with an increase in an angle formed between the optical axis of the projection lens of the virtual projector C4 and the normal line of the virtual plane C3. When the angle formed between the optical axis of the projection lens of the virtual projector C4 and the normal line of the virtual plane C3 is 0 degree, it is possible for the operation controller 153 to use 0.98 as the value of the coefficient b. It is possible for the operation controller 153 to decrease the value of the coefficient b in accordance with the increase in the angle formed between the optical axis of the projection lens of the virtual projector C4 and the normal line of the virtual plane C3 within the range in which the relationship of 0<b<1 is fulfilled. In this case, it becomes possible to make the screen image v2 fit within the touch panel 12 even when the angle formed between the optical axis of the projection lens of the virtual projector C4 and the normal line of the virtual plane C3 increases.

The operation controller 153 makes the virtual projector C4 come closer to the virtual plane C3 along the optical axis of the projection lens of the virtual projector C4 to thereby set the distance Dp to the distance n11. The operation controller 153 sets the distance Dp to the distance n11 to thereby make the width of the screen image v2 smaller than the width H1w of the target image H1.

The description will be returned to FIG. 11. Subsequently, in the step S210, the operation controller 153 decides the second synthesized image Y2.

In the step S210, the operation controller 153 first deletes the virtual plane C3 from the virtual space VS while leaving the image v21, the virtual projector C4, and the path of the projection light from the virtual projector C4 toward the image v21, and the virtual camera C5 in the virtual space VS.

Subsequently, the operation controller 153 decides an image, which is obtained when the virtual camera C5 executes the imaging, as a first virtual image.

The first virtual image has a transmissive property. The first virtual image includes an image obtained by viewing the image v21 in the virtual plane C3 from the second position C2. In the first virtual image, the image obtained by viewing the image v21 in the virtual plane C3 from the second position C2 is an example of the screen image v2.

The first virtual image further includes an image showing the virtual projector C4. In the first virtual image, the image showing the virtual projector C4 is an example of the projector image L1. It should be noted that the virtual camera C5 and the virtual projector C4 are both located at the second position C2. Therefore, when, for example, the virtual camera C5 is larger than the virtual projector C4, there is a possibility that the virtual projector C4 is located inside the virtual camera C5. In this case, the image showing the virtual projector C4 is not included in the first virtual image which is obtained when the virtual camera C5 executes the imaging. When the first virtual image does not include the image showing the virtual projector C4, the operation controller 153 adds the projector image L1 to the first virtual image. The position where the projector image L1 is added to the first virtual image is located in, for example, a lower part in the first virtual image.

The first virtual image further includes an image showing the path of the projection light from the virtual projector C4 toward the screen image v2. In the first virtual image, the image showing the path of the projection light from the virtual projector C4 toward the screen image v2 is an example of the path image L2.

Subsequently, the operation controller 153 superimposes the first virtual image on the target image H1 to thereby decide the second synthesized image Y2.

Subsequently, in the step S211, the operation controller 153 generates the second image data r2 representing the second synthesized image Y2.

Subsequently, in the step S212, the operation controller 153 provides the touch panel 12 with the second image data r2 to thereby make the touch panel 12 display the second synthesized image Y2.

Subsequently, in the step S213, the operation controller 153 decides the image J1a. In the step S213, the operation controller 153 decides the image J1a in accordance with, for example, an instruction by the user. The shape of the image J1a is the same as the shape of the image v21.

Subsequently, in the step S214, the operation controller 153 changes the image v21 to the image J1a.

Subsequently, in the step S215, the operation controller 153 decides the first synthesized image Y1.

In the step S215, the operation controller 153 decides an image, which is obtained when the virtual camera C5 executes the imaging, as a second virtual image.

The second virtual image has a transmissive property. The second virtual image includes an image obtained by viewing the image J1a in the virtual plane C3 from the second position C2. The image obtained by viewing the image J1a in the virtual plane C3 from the second position C2 is the sample image J1.

The second virtual image further includes an image showing the virtual projector C4. In the second virtual image, the image showing the virtual projector C4 is an example of the projector image L1. It should be noted that when the second virtual image does not include the image showing the virtual projector C4 since, for example, the virtual camera C5 is larger than the virtual projector C4, the operation controller 153 adds the projector image L1 to the second virtual image. The position where the projector image L1 is added to the second virtual image is located in, for example, a lower part in the second virtual image.

The second virtual image further includes an image showing the path of the projection light from the virtual projector C4 toward the image J1a. In the second virtual image, the image showing the path of the projection light from the virtual projector C4 toward the image J1a is an example of the path image L2.

Subsequently, the operation controller 153 superimposes the second virtual image on the target image H1 to thereby decide the first synthesized image Y1.

Subsequently, in the step S216, the operation controller 153 generates the first image data r1 representing the first synthesized image Y1.

Subsequently, in the step S217, the operation controller 153 provides the touch panel 12 with the first image data r1 to thereby make the touch panel 12 display the first synthesized image Y1.

A5: Example of Operation

Figure 14:
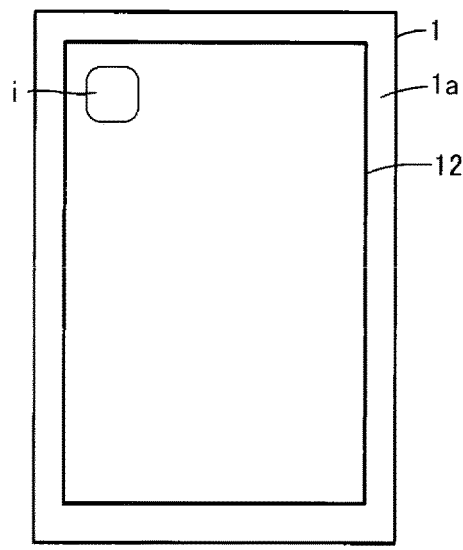
FIG. 14 is a diagram showing an example of an icon i displayed on a touch panel 12.

Then, an example of the operation described above will be descried. It should be noted that when the operation described above is executed, the projector 2 can be present in the building having the wall E1, or can also be absent from the building having the wall E1. In the step S101, the processing device 15 starts the execution of the program P1. The step S101 is executed when the touch panel 12 receives a start-up instruction from the user. The start-up instruction is, for example, is a tap on an icon i representing the program P1 displayed on the touch panel 12. FIG. 14 is a diagram showing an example of the icon i displayed on the touch panel 12.

When the icon i is tapped, the processing device 15 retrieves the program P1 from the storage device 14. Subsequently, the processing device 15 executes the program P1.

The processing device 15 makes the touch panel 12 display a splash screen until the program P1 is executed. When the processing device 15 executes the program P1, the operation controller 153 makes the touch panel 12 display a first guide image t1.

Figure 15:
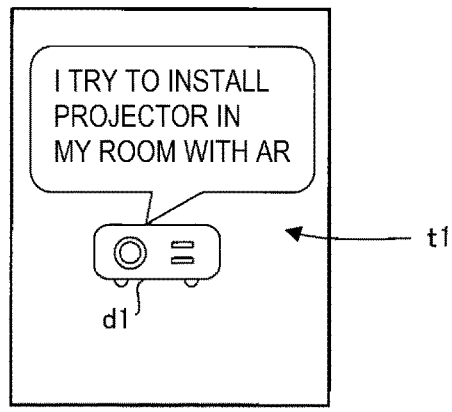
FIG. 15 is a diagram showing an example of a first guide image t1.

FIG. 15 is a diagram showing an example of the first guide image t1. The first guide image t1 shows an outline of a function of the information processing device 1 realized by executing the program P1.

For example, the first guide image t1 shown in FIG. 15 shows a projector d1 which makes a comment "I TRY TO INSTALL PROJECTOR IN MY ROOM WITH AR." AR is an abbreviation of Augmented Reality, and means augmented reality.

The comment shown in the first guide image t1 is not limited to the comment "I TRY TO INSTALL PROJECTOR IN MY ROOM WITH AR," and can arbitrarily be changed. The first guide image t1 is not required to show the projector d1. The first guide image t1 can show an object different from the projector d1 such as an animal instead of the projector d1.

Subsequently, in the step S102, the camera 11 images the target region TR to thereby generate the imaging data kt. Subsequently, in the step S103, the motion sensor 13 generates the motion data m. Subsequently, in the step S104, the acquirer 151 obtains the imaging data kt and the motion data m.

Figure 16:
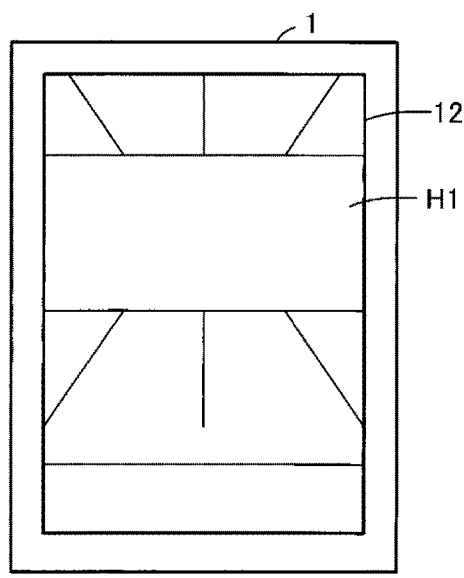
FIG. 16 is a diagram showing an example of the information processing device 1 displaying the target image H1.

After completion of the step S104, it is possible for the operation controller 153 to obtain the imaging data kt from the acquirer 151. In this case, the operation controller 153 provides the touch panel 12 with the imaging data kt as the image data r to thereby make the touch panel 12 display the target image H1. FIG. 16 is a diagram showing an example of the information processing device 1 displaying the target image H1.

Subsequently, in the step S105, the operation controller 153 makes the recognizer 152 recognize the wall E1.

In the step S105, the operation controller 153 first makes the touch panel 12 display an image u1.

Figure 17:
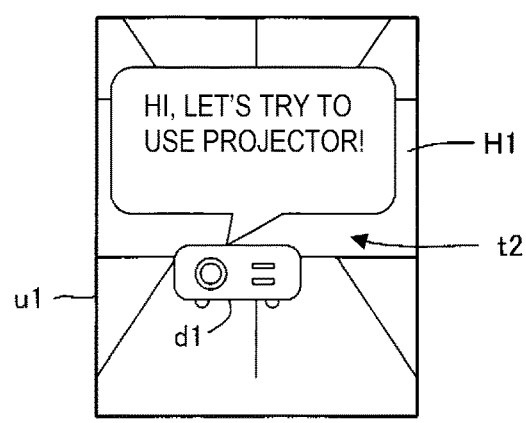
FIG. 17 is a diagram showing an example of an image u1.

FIG. 17 is a diagram showing an example of the image u1. The image u1 is an image obtained by superimposing a second guide image t2 on the target image H1. The second guide image t2 shows the projector d1 making a comment "HI, LET'S TRY TO USE PROJECTOR!"

The comment shown in the second guide image t2 is not limited to the comment "HI, LET'S TRY TO USE PROJECTOR!" but can arbitrarily be changed. The second guide image t2 is not required to show the projector d1. The second guide image t2 can show an object different from the projector d1 such as an animal instead of the projector d1.

Subsequently, the operation controller 153 makes the touch panel 12 display an image u2.

Figure 18:
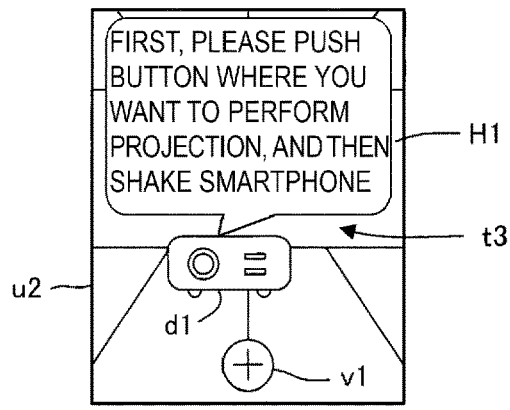
FIG. 18 is a diagram showing an example of an image u2.

FIG. 18 is a diagram showing an example of the image u2. The image u2 is an image obtained by superimposing a third guide image t3 and a button v1 on the target image H1. The third guide image t3 is an image which prompts the user to generate the scanning situation. The scanning situation means the situation in which the information processing device 1 is moved from the first point to the second point while the camera 11 is imaging the wall E1. The button V1 is a button for receiving an input of start of the scanning situation.

The third guide image t3 shows the projector d1 making a comment "FIRST, PLEASE PUSH BUTTON WHERE YOU WANT TO PERFORM PROJECTION, AND THEN SHAKE SMARTPHONE."

The comment shown in the third guide image t3 is not limited to the comment "FIRST, PLEASE PUSH BUTTON WHERE YOU WANT TO PERFORM PROJECTION, AND THEN SHAKE SMARTPHONE," but can arbitrarily be changed as long as the comment prompts the user to generate the scanning situation. The third guide image t3 is not required to show the projector d1. The third guide image t3 can show an object different from the projector d1 such as an animal instead of the projector d1. The configuration of the button v1 is not limited to the configuration shown in FIG. 18, but can arbitrarily be changed.

In accordance with the comment in the first guide image t3, the user pushes the button v1 in the state in which, for example, the wall E1 is displayed on the touch panel 12, and then shakes the information processing device 1.

When the touch panel 12 has detected the tap on the button v1, the operation controller 153 makes the touch panel 12 display an image u3.

Figure 19:
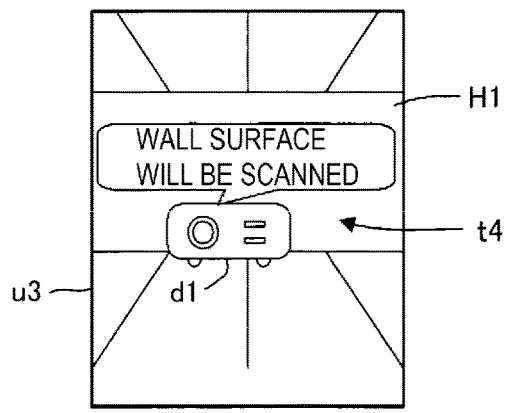
FIG. 19 is a diagram showing an example of an image u3.

FIG. 19 is a diagram showing an example of the image u3. The image u3 is an image obtained by superimposing a fourth guide image t4 on the target image H1. The fourth guide image t4 shows the projector d1 making a comment "WALL SURFACE WILL BE SCANNED."

The comment shown in the fourth guide image t4 is not limited to the comment "WALL SURFACE WILL BE SCANNED," but can arbitrarily be changed. The fourth guide image t4 is not required to show the projector d1. The fourth guide image t4 can show an object different from the projector d1 such as an animal instead of the projector d1.

Figure 20:
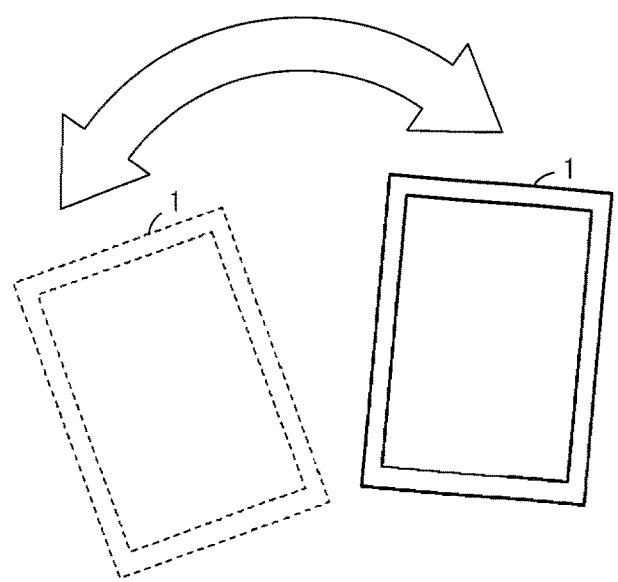
FIG. 20 is a diagram showing a situation in which the information processing device 1 is shaken by the user.

FIG. 20 is a diagram showing a situation in which the information processing device 1 is shaken by the user. When the user shakes the information processing device 1, the scanning situation occurs.

In the scanning situation, the recognizer 152 obtains the first imaging data k1, the second imaging data k2, and the motion data ms.

The recognizer 152 recognizes the wall E1 based on the first imaging data k1, the second imaging data k2, and the motion data ms.

Subsequently, in the step S201, the operation controller 153 makes the recognizer 152 decide the distance n from the information processing device 1 to the wall E1.

Subsequently, in the step S202, the operation controller 153 generates the virtual space VS.

Subsequently, in the step S203, the operation controller 153 sets the first position C1 and the second position C2 in the virtual space VS.

Subsequently, in the step S204, the operation controller 153 disposes the virtual plane C3 in the virtual space VS.

Subsequently, in the step S205, the operation controller 153 disposes the virtual projector C4 in the virtual space VS.

Subsequently, in the step S206, the operation controller 153 disposes the image v21 on the virtual plane C3.

In the step S206, the operation controller 153 first conforms the central position of the image v21 in the virtual plane C3 to the position of the intersection between the virtual plane C3 and the optical axis of the projection lens of the virtual projector C4.

Subsequently, the operation controller 153 sets the path of the projection light proceeding from the virtual projector C4 toward the image v21 in the virtual space VS.

Subsequently, in the step S207, the operation controller 153 installs the virtual camera C5 at the second position C2. The position of the optical axis of the imaging lens of the virtual camera C5 coincides with the position of the optical axis of the projection lens of the virtual projector C4.

Subsequently, in the step S208, the operation controller 153 determines whether or not the field angle C4a of the virtual projector C4 is equal to or larger than the field angle C5a of the virtual camera C5.

When the operation controller 153 judges that the field angle C4a of the virtual projector C4 is equal to or larger than the field angle C5a of the virtual camera C5, the operation controller 153 adjusts the size of the image v21 in the step S209. When the operation controller 153 judges that the field angle C4a of the virtual projector C4 is smaller than the field angle C5a of the virtual camera C5, the step S209 is skipped.

In the step S209, the operation controller 153 adjusts the size of the image v21 by making the virtual projector C4 come closer to the virtual plane C3.

Subsequently, in the step S210, the operation controller 153 decides the second synthesized image Y2.

Subsequently, in the step S211, the operation controller 153 generates the second image data r2 representing the second synthesized image Y2.

Subsequently, in the step S212, the operation controller 153 provides the touch panel 12 with the second image data r2 to thereby make the touch panel 12 display the second synthesized image Y2.

Figure 21:
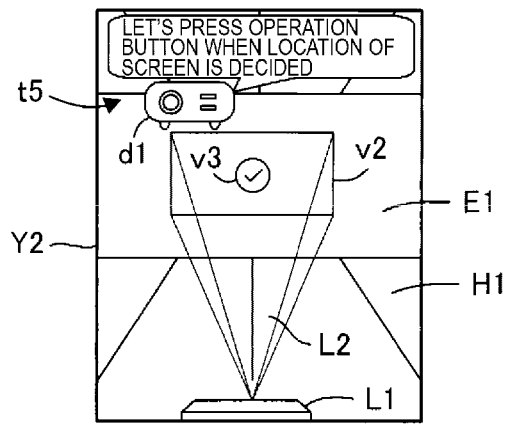
FIG. 21 is a diagram showing an example of the second synthesized image Y2.

FIG. 21 is a diagram showing an example of the second synthesized image Y2. In the second synthesized image Y2 shown in FIG. 21, the fifth guide image t5 is superimposed on the target image H1 in addition to the first virtual image. The first virtual image is an image obtained by the virtual camera C5 executing the imaging.

In the second synthesized image Y2, the position of the screen image v2 to the wall E1 changes in accordance with each of a change in position of the touch panel 12 in the real space RS and a change in orientation of the touch panel 12 in the real space RS. The touch panel 12 is installed in the information processing device 1. Therefore, the change in position of the touch panel 12 in the real space RS means a change in position of the information processing device 1 in the real space RS. Further, the change in orientation of the touch panel 12 in the real space RS means a change in orientation of the information processing device 1 in the real space RS. Therefore, it is possible for the user to adjust the position of the screen image v2 with the feeling as if the information processing device 1 were the projector 2 by changing each of the position of the information processing device 1 and the orientation of the information processing device 1.

Further, a portion of the wall E1 shown in the target image H1 is changed in accordance with each of the change in position of the touch panel 12 in the real space RS and the change in orientation of the touch panel 12 in the real space RS.

Therefore, when there occurs either one of the change in position of the touch panel 12 in the real space RS and the change in orientation of the touch panel 12 in the real space RS, a portion of the wall E1 shown in the target image H1 in the second synthesized image Y2 is changed on the one hand, but the position of the projector image L1 in the second synthesized image Y2 is not changed on the other hand. Therefore, it is possible for the user to adjust the position of the screen image v2 on the wall E1 with the feeling as if the projector 2 existed at the position of the information processing device 1 by viewing the second synthesized image Y2 displayed on the touch panel 12.

The screen image v2 includes an operation button v3. The operation button v3 is used for fixing the position of the screen image v2 to the wall E1. Furthermore, the operation button v3 is used for the user to input a position setting instruction.

The configuration of the operation button v3 is not limited to the configuration shown in FIG. 21, but can arbitrarily be changed. The color of the screen image v2 having the operation button v3 is gray. The color of the screen image v2 having the operation button v3 is not limited to gray, but can arbitrarily be changed.

The fifth guide image t5 is an image which prompts the user to perform an operation of fixing the position of the screen image v2 to the wall E1. The fifth guide image t5 shows the projector d1 making a comment "LET'S PRESS OPERATION BUTTON WHEN LOCATION OF SCREEN IS DECIDED."

The comment shown in the fifth guide image t5 is not limited to the comment "LET'S PRESS OPERATION BUTTON WHEN LOCATION OF SCREEN IS DECIDED," but can arbitrarily be changed as long as the comment prompts the user to perform the operation of fixing the position of the screen image v2. The fifth guide image t5 is not required to show the projector d1. The fifth guide image t5 can show an object different from the projector d1 such as an animal instead of the projector d1.

Figure 22:
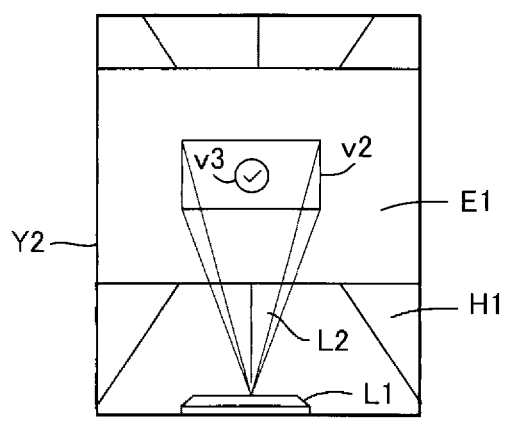
FIG. 22 is a diagram showing another example of the second synthesized image Y2.

The user confirms the second synthesized image Y2 while changing the position of the information processing device 1. FIG. 22 is a diagram showing an example of the second synthesized image Y2 displayed on the information processing device 1 when the position of the information processing device 1 becomes closer to the wall E1 than the position of the information processing device 1 displaying the second synthesized image Y2 shown in FIG. 21. In FIG. 22, the fifth guide image t5 is omitted. The closer to the wall E1 the information processing device 1 is, the lower the ratio of the size of the screen image v2 to the size of the wall E1 becomes. The size of the screen image v2 shown in FIG. 22 is smaller than the size of the screen image v2 shown in FIG. 21. It should be noted that the size of the screen image v2 shown in the second synthesized image Y2 is not required to be changed.

In order to notify the user of a method of decreasing the ratio of the size of the screen image v2 to the size of the wall E1, it is possible for the operation controller 153 to superimpose the image showing the projector d1 making a comment "THE CLOSER YOU GET, THE SMALLER IT BECOMES" on the second synthesized image Y2. The comment "THE CLOSER YOU GET, THE SMALLER IT BECOMES" is an example of a first operation comment representing an operation of decreasing the ratio of the size of the screen image v2 to the size of the wall E1.

The first operation comment is not limited to the comment "THE CLOSER YOU GET, THE SMALLER IT BECOMES," but can arbitrarily be changed. As long as the first operation comment is shown, it is not required to show the projector d1 making the first operation comment. The object making the first operation comment is not limited to the projector d1, but can also be an object different from the projector d1 such as an animal.

Figure 23:
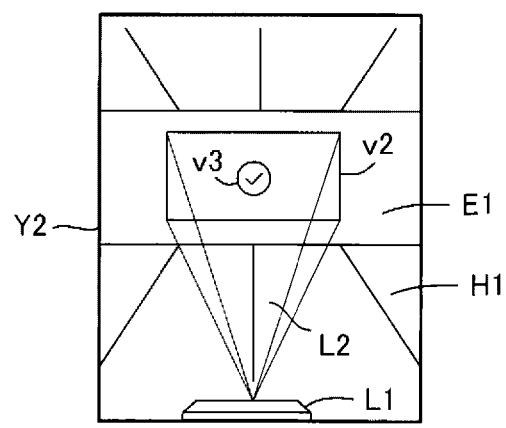
FIG. 23 is a diagram showing still another example of the second synthesized image Y2.

FIG. 23 is a diagram showing an example of the second synthesized image Y2 displayed on the information processing device 1 when the position of the information processing device 1 becomes farther from the wall E1 than the position of the information processing device 1 displaying the second synthesized image Y2 shown in FIG. 21. In FIG. 23, the fifth guide image t5 is omitted. The farther from the wall E1 the information processing device 1 is, the higher the ratio of the size of the screen image v2 to the size of the wall E1 becomes. The size of the screen image v2 shown in FIG. 23 is larger than the size of the screen image v2 shown in FIG. 21. It should be noted that the size of the screen image v2 shown in the second synthesized image Y2 is not required to be changed.

In order to notify the user of a method of increasing the ratio of the size of the screen image v2 to the size of the wall E1, it is possible for the operation controller 153 to superimpose the image showing the projector d1 making a comment "THE FARTHER YOU GET, THE LARGER IT BECOMES" on the second synthesized image Y2. The comment "THE FARTHER YOU GET, THE LARGER IT BECOMES" is an example of a second operation comment representing an operation of increasing the ratio of the size of the screen image v2 to the size of the wall E1.

The second operation comment is not limited to the comment "THE FARTHER YOU GET, THE LARGER IT BECOMES," but can arbitrarily be changed. As long as the second operation comment is shown, it is not required to show the projector d1 making the second operation comment. The object making the second operation comment is not limited to the projector d1, but can also be an object different from the projector d1 such as an animal.

It should be noted that it is possible for the operation controller 153 to change the transmittance of the screen image v2 in the second synthesized image Y2 in accordance with the distance n from the information processing device 1 to the wall E1. For example, the operation controller 153 increases the transmittance of the screen image v2 in the second synthesized image Y2 in accordance with an increase in the distance n. In this case, the visibility of the screen image v2 in the second synthesized image Y2 degrades in accordance with the increase in the distance n. Therefore, it is possible for the operation controller 153 to simulate the phenomenon that the visibility of the projection image F1 in the wall E1 degrades in accordance with the increase in distance from the wall E1 to the projector 2.

Figure 24:
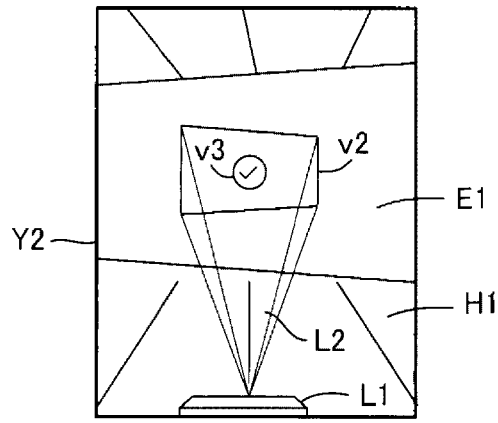
FIG. 24 is a diagram showing still another example of the second synthesized image Y2.
Figure 25:
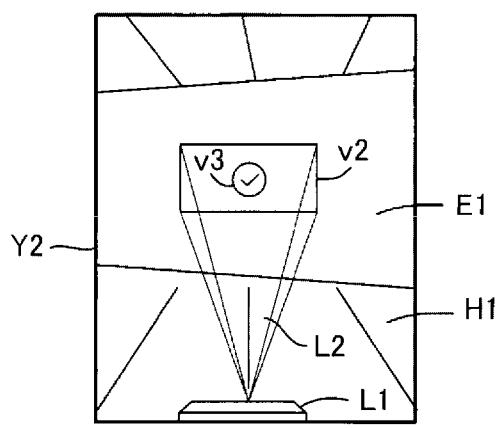
FIG. 25 is a diagram showing still another example of the second synthesized image Y2.

FIG. 24 is a diagram showing an example of the second synthesized image Y2 displayed on the information processing device 1 when the optical axis of the imaging lens 111 is tilted with respect to the normal line of the wall E1. In this case, the screen image v2 has a distortion corresponding to the tilt of the optical axis of the imaging lens 111 with respect to the normal line of the wall E1. The distortion is called a keystone distortion. When the projector 2 has the distortion correction function of correcting the keystone distortion, the operation controller 153 corrects the keystone distortion of the screen image v2 using the distortion correction function equivalent to the distortion correction function provided to the projector 2. FIG. 25 is a diagram showing an example of the second synthesized image Y2 having the screen image v2 in which the keystone distortion shown in FIG. 24 is corrected. In FIG. 24 and FIG. 25, the fifth guide image t5 is omitted.

When the touch panel 12 has detected the tap on the operation button v3, the operation controller 153 fixes the screen image v2 at the position where the screen image v2 has been shown when the operation button v3 has been tapped. Furthermore, the operation controller 153 fixes the image v21 at the position where the image v21 has been shown when the operation button v3 has been tapped.

Subsequently, the operation controller 153 updates the second synthesized image Y2 into an image u5. For example, the operation controller 153 performs deletion of the operation button v3, a change of the color of the screen image v2 from gray to blue, and addition of a sixth guide image t6 on the second synthesized image Y2 to thereby update the second synthesized image Y2 into the image u5. The color which has been changed of the screen image v2 is not limited to blue, but can arbitrarily be changed. The image u5 is an example of the first simulation image.

Figure 26:
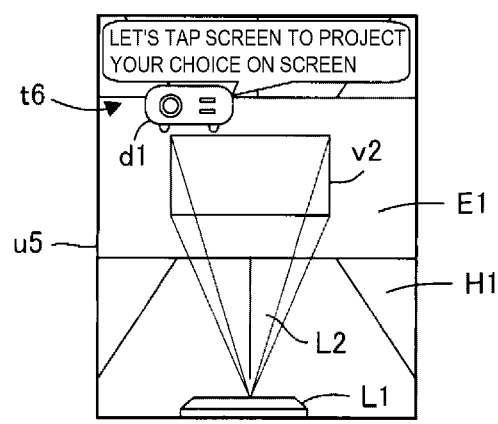
FIG. 26 is a diagram showing an example of an image u5.

FIG. 26 is a diagram showing an example of the image u5. The sixth guide image t6 in the image u5 is an image which prompts the user to decide the image to be displayed in the screen image v2.

In FIG. 26, the sixth guide image t6 shows the projector d1 making a comment "LET'S TAP SCREEN TO PROJECT YOUR CHOICE ON SCREEN."

The comment shown in the sixth guide image t6 is not limited to the comment "LET'S TAP SCREEN TO PROJECT YOUR CHOICE ON SCREEN," but can arbitrarily be changed as long as the comment prompts the user to decide the image to be displayed in the screen image v2. The sixth guide image t6 is not required to show the projector d1. The sixth guide image t6 can show an object different from the projector d1 such as an animal instead of the projector d1.

Figure 27:
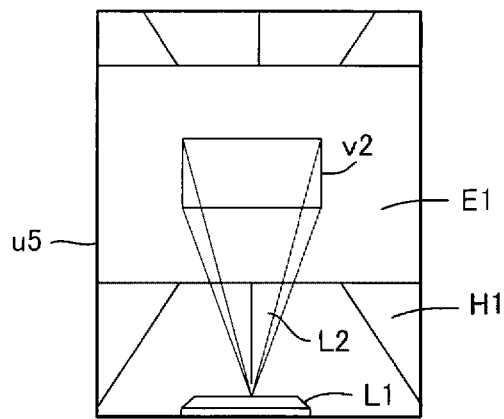
FIG. 27 is a diagram showing another example of the image u5.

It is possible for the user to confirm the screen image v2 thus fixed by looking at the image u5 while moving the information processing device 1. FIG. 27 is a diagram showing an example of the image u5 displayed on the information processing device 1 when the position of the information processing device 1 becomes closer to the wall E1 than the position of the information processing device 1 displaying the image u5 shown in FIG. 26. In FIG. 27, the sixth guide image t6 is omitted. In the situation in which the position of the screen image v2 is fixed, the ratio of the size of the screen image v2 to the size of the wall E1 also decreases in accordance with the decrease in distance between the information processing device 1 and the wall E1. The size of the screen image v2 shown in FIG. 27 is smaller than the size of the screen image v2 shown in FIG. 26. It should be noted that the size of the screen image v2 can be constant.

It is possible for the operation controller 153 to superimpose an image showing the projector d1 which makes the first operation comment such as "THE CLOSER YOU GET, THE SMALLER IT BECOMES" on the image u5. As long as the first operation comment is shown, it is not required to show the projector d1 making the first operation comment. The object making the first operation comment is not limited to the projector d1, but can also be an object different from the projector d1 such as an animal.

Figure 28:
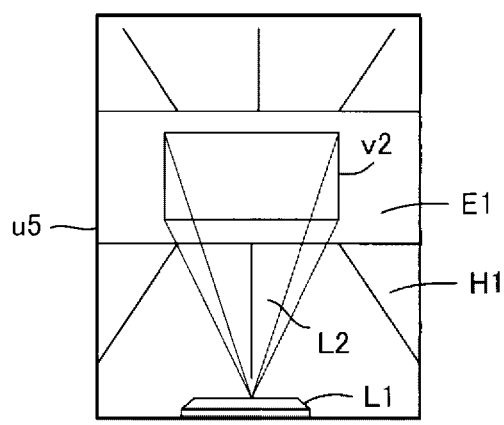
FIG. 28 is a diagram showing still another example of the image u5.

FIG. 28 is a diagram showing an example of the image u5 displayed on the information processing device 1 when the position of the information processing device 1 becomes farther from the wall E1 than the position of the information processing device 1 displaying the image u5 shown in FIG. 26. In FIG. 28, the sixth guide image t6 is omitted. In the situation in which the position of the screen image v2 is fixed, the ratio of the size of the screen image v2 to the size of the wall E1 also increases in accordance with the increase in distance between the information processing device 1 and the wall E1. The size of the screen image v2 shown in FIG. 28 is larger than the size of the screen image v2 shown in FIG. 26. It should be noted that the size of the screen image v2 can be constant.

It is possible for the operation controller 153 to superimpose an image showing the projector d1 which makes the second operation comment such as "THE FARTHER YOU GET, THE LARGER IT BECOMES" on the image u5. As long as the second operation comment is shown, it is not required to show the projector d1 making the second operation comment. The object making the second operation comment is not limited to the projector d1, but can also be an object different from the projector d1 such as an animal.

It should be noted that it is possible for the operation controller 153 to change the transmittance of the screen image v2 in the image u5 in accordance with the distance n from the information processing device 1 to the wall E1. For example, the operation controller 153 increases the transmittance of the screen image v2 in the image u5 in accordance with an increase in the distance n.

Figure 29:
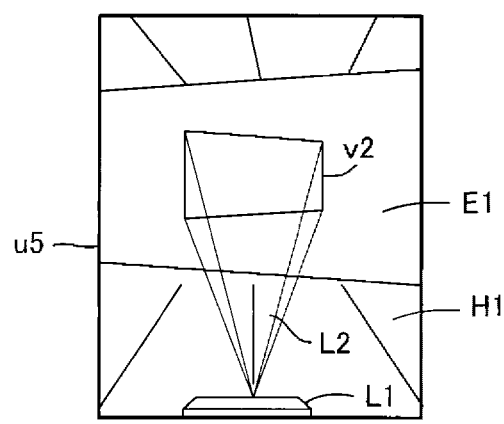
FIG. 29 is a diagram showing still another example of the image u5.
Figure 30:
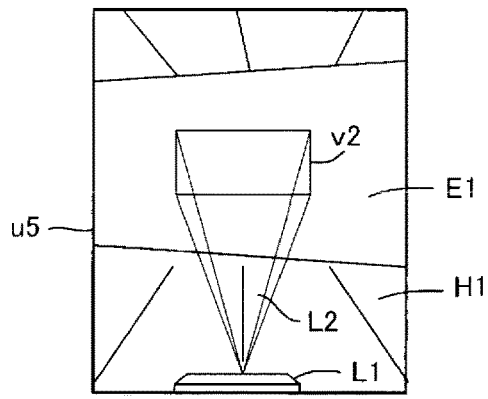
FIG. 30 is a diagram showing still another example of the image u5.

FIG. 29 is a diagram showing an example of the image u5 displayed on the information processing device 1 when the optical axis of the imaging lens 111 is tilted with respect to the normal line of the wall E1. In this case, the screen image v2 has a keystone distortion corresponding to the tilt of the optical axis of the imaging lens 111 with respect to the normal line of the wall E1. When the projector 2 has the distortion correction function of correcting the keystone distortion, the operation controller 153 corrects the keystone distortion of the screen image v2 using the distortion correction function equivalent to the distortion correction function provided to the projector 2. FIG. 30 is a diagram showing an example of the image u5 having the screen image v2 in which the keystone distortion shown in FIG. 29 is corrected. In FIG. 29 and FIG. 30, the sixth guide image t6 is omitted.

It is possible for the user to decide the image to be displayed in the screen image v2 by operating the information processing device 1 in accordance with the sixth guide image t6.

When the touch panel 12 has detected the tap on the screen image v2 in the image u5, the operation controller 153 makes the touch panel 12 display a menu image v4.

Figure 31:
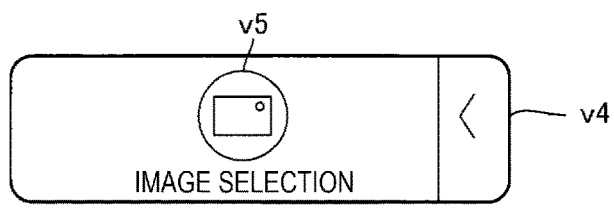
FIG. 31 is a diagram showing an example of a menu image v4.

FIG. 31 is a diagram showing an example of the menu image v4. The menu image v4 includes a selection button v5.

The selection button v5 is used for deciding an image to be displayed in the screen image v2, namely the sample image J1.

When the touch panel 12 has detected a tap on the button v5, the operation controller 153 makes the touch panel 12 display an image v81.

Figure 32:
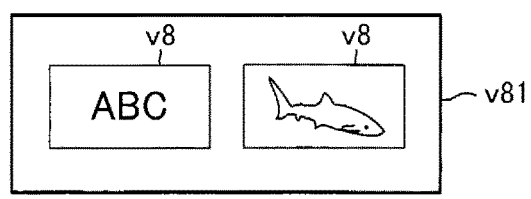
FIG. 32 is a diagram showing an example of image candidates v8.

FIG. 32 is a diagram showing an example of the image v81. The image v81 shows candidates v8 of an image to be displayed in the screen image v2. The candidates v8 of the image are each an image corresponding to the projection image F1 projected from the projector 2. For example, the candidates v8 of the image are each an image showing the projection image F1 projected from the projector 2. The candidate v8 of the image is, for example, a photographic image represented by photographic data. The candidate v8 of the image can be an image of a document represented by document data.

The user taps one of the candidates v8 of the image to be used as the sample image J1. When the tough panel 12 has detected the tap on the candidate v8 of the image, the operation controller 153 decides the candidate v8 of the image thus tapped as the second image having the rectangular shape.

Subsequently, in the step S213, the operation controller 153 makes the shape and the size of the second image having the rectangular shape coincide with the shape and the size of the image v21 to thereby decide the image J1a.

Subsequently, in the step S214, the operation controller 153 changes the image v21 to the image J1a.

Subsequently, in the step S215, the operation controller 153 decides the first synthesized image Y1.

Subsequently, in the step S216, the operation controller 153 generates the first image data r1 representing the first synthesized image Y1.

Subsequently, in the step S217, the operation controller 153 provides the touch panel 12 with the first image data r1 to thereby make the touch panel 12 display the first synthesized image Y1.

It should be noted that when the operation controller changes the position of the virtual projector C4 to a position different from the second position C2, it is possible for the operation controller 153 to include an image representing the fact that the position of the virtual projector C4 has been adjusted in the first synthesized image Y1 and the second synthesized image Y2.

The image representing the fact that the position of the virtual projector C4 has been adjusted is, for example, an image showing a comment "IMAGE WITH POSITIONING DONE."

The image representing the fact that the position of the virtual projector C4 has been adjusted is not limited to the image showing the comment "IMAGE WITH POSITIONING DONE," but can arbitrarily be changed.

A6: Conclusion of First Embodiment

The display method and the information processing device 1 according to the first embodiment include the following aspects.

The acquirer 151 obtains the target image H1 showing the target region TR including the wall E1. When the operation controller 153 makes the touch panel 12 display the sample image J1, the operation controller 153 makes the touch panel 12 display the first synthesized image Y1 which is obtained by superimposing the sample image J1 which fits within the touch panel 12 on the target image H1 irrespective of the position of the touch panel 12. The sample image J1 is an image obtained by viewing an image, which is displayed on the virtual plane C3 in the situation in which the image is projected from the virtual projector C4 on the virtual plane C3 located at the first position C1 in the virtual space VS, from the second position C2. In the virtual space VS, the first position C1 is a position corresponding to the position of the wall E1 in the real space RS. In the virtual space VS, the second position C2 is a position corresponding to the position of the touch panel 12 in the real space RS.

According to this aspect, the first synthesized image Y1 obtained by superimposing the sample image J1 which fits within the touch panel 12 on the target image H1 is displayed on the touch panel 12 irrespective of the position of the touch panel 12. Therefore, it is possible for the user to view the first synthesized image Y1 including the sample image J1 fitting within the touch panel 12 irrespective of the position of the touch panel 12. It is possible for the user to easily imagine the state in which the projector 2 projects the projection image F1 by viewing the first synthesized image Y1. Therefore, it is possible to provide the information processing device 1 high in convenience.

The operation controller 153 adjusts the distance between the virtual plane C3 and the virtual projector C4 to thereby adjust the size of the sample image J1 so that the sample image J1 fits within the touch panel 12. According to this aspect, it is possible to adjust the size of the sample image J1 so that the sample image J1 fits within the touch panel 12 without the user moving the information processing device 1 in the real space RS in order to adjust the size of the sample image J1.

The operation controller 153 adjusts the distance between the virtual plane C3 and the virtual projector C4 based on the distance between the touch panel 12 and the wall E1 to thereby adjust the size of the sample image J1 so that the sample image J1 fits within the touch panel 12. According to this aspect, it is possible to adjust the size of the sample image J1 so that the sample image J1 fits within the touch panel 12 based on the distance between the touch panel 12 and the wall E1.

The operation controller 153 adjusts the distance between the virtual plane C3 and the virtual projector C4 based on the distance between the touch panel 12 and the wall E1, and the field angle C4a of the virtual projector C4 to thereby adjust the size of the sample image J1 so that the sample image J1 fits within the touch panel 12. According to this aspect, it is possible to adjust the size of the sample image J1 so that the sample image J1 fits within the touch panel 12 based on the distance between the touch panel 12 and the wall E1 and the field angle C4a of the virtual projector C4.

The first synthesized image Y1 includes the projector image L1 as the image showing the projector 2. The projector image L1 is located in a portion corresponding to the second position C2 in the first synthesized image Y1. According to this aspect, it is possible for the user to easily imagine the state in which the projector 2 projects the projection image F1 by viewing the state in which the projector shown in the projector image L1 projects the sample image J1.

B: Modified Examples

Some aspects of the modifications of the embodiment hereinabove illustrated will hereinafter be illustrated. It is also possible to arbitrarily combine two or more aspects arbitrarily selected from the following illustrations with each other within a range in which the aspects do not conflict with each other.

B1: First Modified Example

In the first embodiment, it is possible for the operation controller 153 to adjust the field angle C4a of the virtual projector to thereby adjust the size of the screen image v2 and the size of the sample image J1 so that the screen image v2 and the sample image J1 fit within the touch panel 12.

For example, when the field angle C4a of the virtual projector C4 is equal to or larger than the field angle C5a of the virtual camera C5, the operation controller 153 changes the field angle C4a of the virtual projector C4 to be smaller than the field angle C5a of the virtual camera C5 to thereby adjust the size of the screen image v2 and the size of the sample image J1 so that the screen image v2 and the sample image J1 fit within the touch panel 12. Further, for example, it is possible for the operation controller 153 to change the value of the field angle C4a included in the specifications of the virtual projector C4 to a value smaller than the field angle C5a of the camera 11, namely a value smaller than the field angle C5a of the virtual camera C5.

According to the first modified example, it is possible to adjust the size of the screen image v2 and the size of the sample image J1 so that the screen image v2 and the sample image J1 fit within the touch panel 12 without moving virtual projector C4. Further, it is possible to omit the processing of calculating the position of the virtual projector C4 having been moved.

As the method of adjusting the field angle C4a of the virtual projector C4, it is possible for the operation controller 153 to use the method of using a virtual projector of a model having a field angle smaller than the field angle C5a provided to the camera 11 as the virtual projector C4. For example, the operation controller 153 uses the method of changing the model of the virtual projector C4 from a first virtual projector having a field angle no smaller than the field angle C5a provided to the camera 11 to a second virtual projector having a field angle smaller than the field angle C5a provided to the camera 11. Specifically, the operation controller 153 refers to the specifications of the plurality of models of projectors stored in the program P1, and then selects the projector of the model having the field angle smaller than the field angle C5a of the camera 11 as the virtual projector C4. In this case, by changing the virtual projector C4, it is possible to adjust the size of the screen image v2 and the size of the sample image J1 so that the screen image v2 and the sample image J1 fit within the touch panel 12.

It is possible for the operation controller 153 to make the touch panel 12 display a name of an existing projector corresponding to the first virtual projector and a name of an existing projector corresponding to the second virtual projector. In this case, it is possible for the user to easily recognize the projector to be simulated by the information processing device 1.

It is possible for the operation controller 153 to use a method of adjusting the field angle of a virtual projection lens of the virtual projector C4 as the method of adjusting the field angle C4a of the virtual projector C4. In this case, the operation controller 153 adjusts the field angle of the virtual projection lens to thereby adjust the size of the screen image v2 and the size of the sample image J1 so that the screen image v2 and the sample image J1 fit within the touch panel 12.

For example, when the field angle of the virtual projection lens is equal to or larger than the field angle C5a of the virtual camera C5, the operation controller 153 changes the field angle of the virtual projection lens to be smaller than the field angle C5a of the virtual camera C5 to thereby adjust the size of the screen image v2 and the size of the sample image J1 so that the screen image v2 and the sample image J1 fit within the touch panel 12. Further, for example, it is possible for the operation controller 153 to change the value of the field angle of the virtual projection lens included in the specifications of the virtual projector C4 to a value smaller than the field angle C5a of the camera 11, namely a value smaller than the field angle C5a of the virtual camera C5.

In this case, it is possible to adjust the size of the screen image v2 and the size of the sample image J1 so that the screen image v2 and the sample image J1 fit within the touch panel 12 without moving the virtual projector C4. Further, it is possible to omit the processing of calculating the position of the virtual projector C4 having been moved.

It is possible for the operation controller 153 to use the virtual projection lens having the field angle smaller than the field angle C5a of the camera 11 as the virtual projection lens of the virtual projector C4 as the method of adjusting the field angle of the virtual projection lens. For example, it is possible for the operation controller 153 to use the method of changing the virtual projection lens from a first virtual projection lens having a field angle no smaller than the field angle C5a provided to the camera 11 to a second virtual projection lens having a field angle smaller than the field angle C5a provided to the camera 11. Further, for example, it is possible for the operation controller 153 to change the value of the field angle of the virtual projection lens included in the specifications of the virtual projector C4 from a value no smaller than the field angle C5a of the camera 11 to a value smaller than the field angle C5a of the camera 11. In this case, by changing the virtual projection lens, it is possible to adjust the size of the screen image v2 and the size of the sample image J1 so that the screen image v2 and the sample image J1 fit within the touch panel 12.

It is possible for the operation controller 153 to make the touch panel 12 display a name of an existing projection lens corresponding to the first virtual projection lens and a name of an existing projection lens corresponding to the second virtual projection lens. In this case, it is possible for the user to easily recognize the projection lens to be used in the simulation by the information processing device 1.

B2: Second Modified Example

In the first embodiment, and the first modified example, it is possible for the operation controller 153 to include an additional image L3 as an image based on the distance between the position of the virtual projector C4 and the second position C2 in at least one of the first synthesized image Y1 and the second synthesized image Y2. The additional image L3 is an example of an image showing the distance between the position of the virtual projector C4 and the second position C2.

Figure 33:
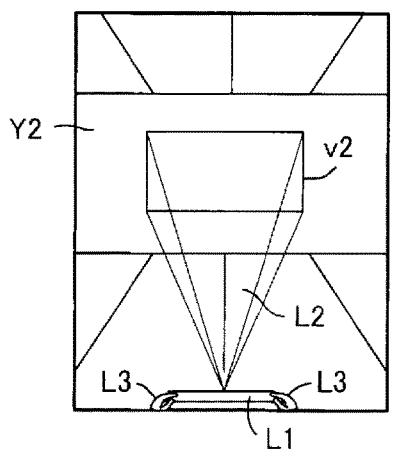
FIG. 33 is a diagram showing an example of the second synthesized image Y2.

FIG. 33 is a diagram showing an example of the second synthesized image Y2 including the additional image L3. The additional image L3 shows hands which hold the projector shown in the projector image L1. Therefore, it is possible for the user to confirm the appearance of the projection image F1 with the feeling as if the user held the projector 2 in hand to move the projector 2. It should be noted that the additional image L3 can be different from the image showing hands which hold the projector shown in the projector image L1. For example, the additional image L3 can be an image showing the distance between the position of the virtual projector C4 and the second position C2. Specifically, the additional image L3 can be a scale line indicating a distance, or a line segment having a length corresponding to a distance. When the scale line or the line segment is used as the additional image L3, for example, the additional image L3 can be displayed between the position of the virtual projector C4 and the second position C2.

The operation controller 153 decides a position of the additional image L3 in the second synthesized image Y2 based on the distance between the position of the virtual projector C4 and the second position C2. For example, the operation controller 153 increases a distance between an end part at the virtual projector C4 side or the screen image v2 side of the additional image L3 and the second position C2 in the second synthesized image Y2 in accordance with an increase in the distance between the position of the virtual projector C4 and the second position C2. Therefore, due to the additional image L3, it becomes easy for the user to recognize the relationship between the position of the projector shown in the projector image L1 and the position of the screen image v2.

B3: Third Modified Example

In the first embodiment, and the first and second modified examples, when the operation controller 153 receives an input instructing a switch of the display while the touch panel 12 is displaying the first synthesized image Y1 or the second synthesized image Y2, it is possible for the operation controller 153 to perform the operations shown in FIG. 11 except the operation in the step S209.

In this case, the operation controller 153 makes the touch panel 12 display the simulation image. The simulation image is an example of a second simulation image. The simulation image is an image obtained by superimposing the display image on the target image H1. The display image is an example of the second display image. The display image is an image obtained by viewing an image, which is displayed on the virtual plane C3 in the situation in which the image is projected on the virtual plane C3 located at the first position C1 from the virtual projector C4 the relative position to the second position C2 of which is fixed, from the second position C2. In this case, the size of the display image is not adjusted. The simulation image can be an image obtained by superimposing the projector image L1 and the path image L2 on the target image H1 in addition to the display image.

According to the third modified example, when the field angle C4a of the virtual projector C4 is equal to or larger than the field angle C5a of the virtual camera C5, the simulation image shows a state in which the display image does not fit within the touch panel 12. Therefore, by viewing the simulation image, it becomes easy for the user to recognize the fact that the first synthesized image Y1 and the second synthesized image Y2 are each a conditioned image.

B4: Fourth Modified Example

In the first embodiment, and the first through third modified examples, when the touch panel 12 has received an instruction of fixing the virtual projector C4 from the user after the operation controller 153 has made the touch panel 12 display at least one of the first synthesized image Y1 and the second synthesized image Y2, it is possible for the operation controller 153 to fix the position of the virtual projector C4 to the virtual space VS.

For example, the operation controller 153 fixes the virtual projector C4 to the position where the virtual projector C4 has been located when the touch panel 12 has received the instruction of fixing the virtual projector C4 from the user.

In this case, the operation controller 153 makes the touch panel 12 display a superimposed image. The superimposed image is also called a third simulation image. The superimposed image is an image obtained by superimposing a third virtual image on the target image H1. The third virtual image is also called a third display image. The third virtual image is an image obtained by viewing an image, which is displayed on the virtual plane C3 in the situation in which the virtual projector C4 the position of which is fixed in the virtual space VS projects the image on the virtual plane C3, from the second position C2. The virtual projector C4 the position of which is fixed in the virtual space VS means the virtual projector C4 the absolute position of which is fixed in the virtual space VS. It should be noted that when the information processing device 1 is relocated at the position where the information processing device 1 has been located when the touch panel 12 has received the instruction of fixing the virtual projector C4 from the user in the situation in which the superimposed image is displayed, it is possible for the operation controller 153 to refix the virtual projector C4 to the second position C2.

According to the fourth modified example, since the superimposed image is displayed in addition to the first synthesized image Y1 and the second synthesized image Y2, it is possible to further help the user recognize the installation position of the projector 2.

B5: Fifth Modified Example

In the first embodiment, and the first through fourth modified examples, the camera 11, the touch panel 12, and the processing device 15 can be made as separated bodies. In the first embodiment, and the first through fourth modified examples, the camera 11 and the touch panel 12 can be separated from the information processing device 1. In the first embodiment, and the first through fourth modified examples, the camera 11 can be separated from the information processing device 1. In the first embodiment, and the first through fourth modified examples, the touch panel 12 can be separated from the information processing device 1. In the first embodiment, and the first through fourth modified examples, the display 121 and the input device 122 can be separated from each other.

What is claimed is:
1. A display method comprising:
  obtaining a target image showing a target region including a surface in a real space having the target region and a display;

displaying, on the display, a first simulation image including the target image and a first display image which is superimposed on the target image and fits within the display irrespective of a position of the display in real space, the first display image being obtained by viewing an image projected on a virtual plane corresponding to the surface from a virtual projector in a virtual space, the virtual plane being located at a first position corresponding to a position of the surface in the real space, from a second position corresponding to the position of the display in the real space; and adjusting a distance between the virtual plane and the virtual projector to thereby adjust a size of the first display image to a size that fits within the display.

2. The display method according to claim 1, further comprising:
adjusting a distance between the virtual plane and the virtual projector based on a distance between the display and the surface to thereby adjust a size of the first display image to a seize that fits within the display.

3. The display method according to claim 1, further comprising:
adjusting a distance between the virtual plane and the virtual projector based on a distance between the display and the surface, and a field angle of the virtual projector to thereby adjust a size of the first display image to a size that fits within the display.

4. The display method according to claim 1, further comprising:
adjusting a field angle of the virtual projector to thereby adjust a size of the first display image to a seize that fits within the display.

5. The display method according to claim 4, wherein
the obtaining the target image includes obtaining the target image using a camera, and
the adjusting includes using a virtual projector of a model having a field angle smaller than a field angle of the camera as the virtual projector to thereby adjust the field angle of the virtual projector.

6. The display method according to claim 1, wherein
the virtual projector includes a virtual projection lens configured to project the image on the virtual plane.

7. The display method according to claim 6, further comprising:
adjusting a field angle of the virtual projection lens to thereby adjust a size of the first display image to a size that fits within the display.

8. The display method according to claim 7, wherein
the obtaining the target image includes obtaining the target image using a camera, and
the adjusting includes using a virtual projection lens having a field angle smaller than a field angle of the camera as the virtual projection lens to thereby adjust the field angle of the virtual projection lens.

9. The display method according to claim 1, wherein
the first simulation image includes a projector image that shows a projector, and
the projector image is located in a portion corresponding to a position of the virtual projector in the virtual space in the first simulation image.

10. The display method according to claim 1, wherein
the first simulation image includes an image showing a distance between a position of the virtual projector and the second position.

11. The display method according to claim 10, further comprising:
determining a position of the image showing the distance in the first simulation image based on the distance between the position of the virtual projector and the second position.

12. The display method according to claim 10, wherein
the image showing the distance shows a hand holding the projector shown in the projector image.

13. The display method according to claim 1, further comprising:
when an input of an instruction is received while displaying the first simulation image on the display, displaying, on the display, a second simulation image including the target image and a second display image superimposed on the target image, the second display image being obtained by viewing, from the second position, an image projected on the virtual plane from the virtual projector, a relative position of which to the second position is fixed.

14. A display method comprising:
obtaining a target image showing a target region including a surface in a real space having the target region and a display;
displaying, on the display, a first simulation image including the target image and a first display image which is superimposed on the target image and fits within the display irrespective of a position of the display in real space, the first display image being obtained by viewing an image projected on a virtual plane corresponding to the surface from a virtual projector in a virtual space, the virtual plane being located at a first position corresponding to a position of the surface in the real space, from a second position corresponding to the position of the display in the real space; and
adjusting a field angle of the virtual projector to thereby adjust a size of the first display image to a seize that fits within the display.

15. A display method comprising:
obtaining a target image showing a target region including a surface in a real space having the target region and a display; and
displaying, on the display, a first simulation image including the target image and a first display image which is superimposed on the target image and fits within the display irrespective of a position of the display in real space, the first display image being obtained by viewing an image projected on a virtual plane corresponding to the surface from a virtual projector in a virtual space, the virtual plane being located at a first position corresponding to a position of the surface in the real space, from a second position corresponding to the position of the display in the real space, wherein
the virtual projector includes a virtual projection lens configured to project the image on the virtual plane.

* * * * *